US012535050B2

(12) United States Patent
Pavlov

(10) Patent No.: US 12,535,050 B2
(45) Date of Patent: Jan. 27, 2026

(54) INTEGRATED BLADE FOR WIND TURBINES HAVING COUPLED BLADES

(71) Applicant: Andrei Pavlov, Naantali (FI)

(72) Inventor: Andrei Pavlov, Naantali (FI)

( * ) Notice: Subject to any disclaimer, the term of this patent is extended or adjusted under 35 U.S.C. 154(b) by 62 days.

(21) Appl. No.: 18/470,839

(22) Filed: Sep. 20, 2023

(65) Prior Publication Data

US 2024/0093667 A1    Mar. 21, 2024

Related U.S. Application Data

(60) Provisional application No. 63/408,217, filed on Sep. 20, 2022.

(51) Int. Cl.
*F03D 1/06* (2006.01)

(52) U.S. Cl.
CPC ........ *F03D 1/0675* (2013.01); *F05B 2230/60* (2013.01)

(58) Field of Classification Search
CPC ........ F03D 1/065; F03D 1/0675; F03D 3/061; F03D 3/062; F05B 2230/60
USPC ...................................... 416/223 R
See application file for complete search history.

(56) References Cited

U.S. PATENT DOCUMENTS

| 5,474,425 | A | 12/1995 | Lawlor | |
|---|---|---|---|---|
| 7,530,785 | B1 | 5/2009 | Deering et al. | |
| 8,128,364 | B2 * | 3/2012 | Pesetsky | F03D 1/0675 |
| | | | | 415/4.3 |
| 8,647,063 | B2 * | 2/2014 | Koike | F03D 1/0675 |
| | | | | 416/88 |
| 10,024,299 | B2 | 7/2018 | Kelly | |
| 10,094,358 | B2 * | 10/2018 | Hökelek | F03D 1/0675 |
| 10,253,753 | B2 * | 4/2019 | Berthilsson | F03D 3/062 |
| 10,400,748 | B2 | 9/2019 | Sagel | |
| 10,400,749 | B2 | 9/2019 | Spruce | |
| 10,428,790 | B2 | 10/2019 | Smith | |
| 11,028,825 | B2 | 6/2021 | Hunter | |
| 11,187,203 | B2 | 11/2021 | Badger | |
| 11,319,921 | B2 | 5/2022 | Nielsen et al. | |
| 11,371,482 | B2 | 6/2022 | Hancock et al. | |
| 11,466,663 | B2 | 10/2022 | Andersen et al. | |
| 2008/0317599 | A1 * | 12/2008 | Martinez | F03D 1/0675 |
| | | | | 416/182 |
| 2019/0024629 | A1 * | 1/2019 | Berthilsson | F03D 1/0633 |
| 2020/0141383 | A1 * | 5/2020 | Berthilsson | F03D 1/0675 |

FOREIGN PATENT DOCUMENTS

| WO | 2010061218 A2 | 6/2010 |
|---|---|---|
| WO | 2011134810 A1 | 11/2011 |
| WO | 2014053136 A1 | 4/2014 |
| WO | 2020015803 A1 | 1/2020 |

* cited by examiner

*Primary Examiner* — Nathaniel E Wiehe
*Assistant Examiner* — Justin A Pruitt
(74) *Attorney, Agent, or Firm* — Koivula & Somersalo, LLC

(57) ABSTRACT

Disclosed is an integrated blade having coupled blades for wind turbine (IBWT) device. The disclosed solution provides a significant increase of generated power realized mainly by using coupled blades. The coupled blades are situated close to each other and oriented near-parallel to each other. They are mounted in the same body/frame and only one fixation mechanism is needed to fix the device/construction on the rotation rod connected to a turbine.

11 Claims, 18 Drawing Sheets a)

b)

INTEGRATED BLADE FOR WIND TURBINES HAVING COUPLED BLADES

PRIORITY

This application claims priority of the U.S. provisional application No. 63/408,217 filed on Sep. 20, 2022.

FIELD OF INVENTION

The current disclosure belongs to wind generators for generation of electricity using wind energy, particularly, to blades of wind turbines and their fabrication technology.

BACKGROUND OF THE INVENTION

There are two main different approaches for wind generators. These are generators with horizontally oriented rotating rods of the turbines and vertically oriented rotating rods. The wind catching surfaces of vertically oriented rotating axes/rods may use plenty of different geometries, for example, spiral-like shapes, complex curved surfaces, multi-surface designs etc. Despite some of them having small sizes can generate electricity, but their power is low, they cannot be scaled to big sizes for generation electricity with big power because their masses would increase dramatically, and the generators will be non-efficient. On the other hand, designs with horizontal rotating rods are more practical. These devices can be installed on tall towers relatively high above the surface and blades can be very long more than 100 meters. The blades have shapes which are built on physical principles for blades of propellers of airplanes. The designs of wind blades have many modifications, they are much longer than the blades of propellers of airplanes. But, despite of some differences, the basic geometry remains the same. Increase of power of wind generators is achieved mainly by increase of size of the blades. Therefore, technologies of fabrication of the blades, their transportation and installation are very expensive.

Traditional turbine blades are complex structures and fabrication processes are complicated that require many chemical materials and many fabrication steps, for example, Paul Badger disclosed a multi-section and multi-layered structure of blades (Paul Badger U.S. Pat. No. 11,187,203 B2). The fabrication processes include, for example, fused deposition modelling, direct metal layer sintering, VAT photopolymerization, vacuum assisted resin transfer moulding, digital light processing, stereolithography, selective laser sintering, selective laser melting, electron beam melting, binder jetting, material jetting and others. There are solutions to make blades from different parts. Modular wind turbine blade (Robert Hunter, U.S. Pat. No. 11,028,825 B2) uses spar caps for connection individual modules of the blade.

The U.S. Pat. No. 7,530,785 discloses pitch control mechanisms to control pitch angle of the blades. Functioning and control technique of blades during operation is disclosed by Chris Spruce (U.S. Pat. No. 10,400,749 B2). Balancing of mass of blades is disclosed in WO 2020/015803 A1. Wind turbine with hinged blades and carrying structures is disclosed in U.S. Pat. No. 11,319,921. This design allows more control of the blades during operation.

The U.S. Pat. No. 11,466,663 discloses a wind turbine with a pivoted rotor blades and a mechanism for stopping.

Bjertrup Nielsen et al. disclosed parameters of long blades, longer than 50 meters, by using combined radius specific solidity parameter (WO 2011/134810).

The Pat. Appl. WO 2010/061218 discloses the fabrication process of the wind turbine blades by dispensing fibers onto a mould.

The U.S. Pat. No. 10,920,744 discloses the fabrication method of the wind turbine blades by placing a web on an inner surface of the blade shell and applying adhesive onto the web.

The U.S. Pat. No. 10,428,790 discloses the fabrication process based on resin infusion process into a mould.

The U.S. Pat. No. 11,371,482 discloses the fabrication process using elongate stack of layers of pultruded fibrous composite strips.

The U.S. Pat. No. 5,474,425 discloses geometrical parameters of the wind turbine blades as well as power vs. wind characteristics.

The control method of blades using sensors such as anemometer sensor, ultra-sonic sensor, a light detection and ranging device is disclosed in WO 2014/053136.

Transportation of wind turbine blades requires its own technical solutions too (U.S. Pat. No. 10,024,299).

There are wind turbines using rotation around vertical axis, for example, using folded blades (U.S. Pat. No. 10,400,748). Disadvantages of these types of wind turbines is limitation in size. They are relatively small. Stability may be a problem because they use very wide blades and big supporting parts around the blades.

SUMMARY OF THE INVENTION

An integrated blade having coupled blades for wind turbine (IBWT) device is disclosed. Increase of efficiency of blades for wind turbines is a major problem for generation of electricity using wind energy. Significant increase of generated power is practically realized mainly by increasing size of the blades. However, it is possible to significantly increase power of the wind turbine by using coupled blades. The coupled blades are situated close to each other and oriented near-parallel to each other. By near parallel it is meant here that the orientation of the blades may deviate from parallel orientation not more than 30 degrees, and preferably not more than 15 degrees. They are mounted in the same body/frame and only one fixation mechanism is needed to fix the device/construction on the rotation rod connected to a turbine. Traditional technologies used for fabrication of blades for wind turbines allow fabrication of one blade with one fixation base only. Fabrication process is complicated and requires specific chemicals for gluing different parts of the blade structure. Due to complex shape of the blade, the fabrication is made by multistep process. Fabrication of two blades simultaneously using that technology is impossible because each blade requires an individual carrying tube and individual fabrication process. Integration of two traditional blades together connected to each other is problematic because of high weight of the whole construction. Therefore, there are no technical solutions suggesting two-blades construction where the blades are connected to each other.

Disclosed is a device comprising two blades integrated within one frame/body/carrying structure. The carrying structure is made by bending of a fat matrix/template, for example, a sheet metal patterned with openings/holes. The bending of the patterned sheet metal is relatively easy when the openings cover more than 80% of the surface area, and the final structure becomes rigid due to high spring forces of the material having high stiffness. When the two or more blades are integrated in such structure, the whole device becomes even more rigid with stronger mechanical properties. The disclosed design allows integrate at least two blades within one carrying body. A first blade is a bigger one, the second blade is slightly smaller, having surface are of about 70% to 80% of the surface of the first blade.

The IBWT has several advantages. One, the IBWT increases effective total working area within compact geometry. Two, the reflected air flow is directed aside through holes in the carrying body. This increases the effective mechanical rotational momentum. The reflected air flow against the incoming air flow is minimal. In addition, it can effectively work at different incoming air flow angles. Three, the IBWT structure is rigid and light. All main components of the device are made from thin materials or layers. They have different shapes and are connected in one carrying body. Four, manufacturing of the IBWT is simpler than existing technological processes used for fabrication of traditional wind blades. One can use a variety of materials, sheet metal, metal films, plastic, rubber, polymers, textiles, and composite materials.

The increase of the effective working area results from two design features. First, the curved carrying body allows us to make the blade wider. Second, there are at least two blades in one IBWT device. Therefore, the effective working area producing rotational momentum can be significantly increased. The device works effectively at different wind angles, therefore, there is an additional increase of the efficiency of the turbine.

The IBWT consists of the following components. The first main component is a shaped thin-surface carrying body (CB). It is made from a flat shaped thin matrix/template made of elastic and rigid material. Preferably, a sheet metal having high spring coefficient. Other parts of the device are integrated inside the carrying body. The thin surface carrying body is made by bending a patterned rigid flat material. To make the further description clear we will introduce some terms that will help to describe geometrical features during deformation/bending process. We assume that the plane of the initial flat material is a base plane. There is a base symmetry line laying on the base plane. Initially, the flat thin template has a symmetrical shape relative to the base symmetry line, there is a wide part of the layer and a narrow part. The profile has a smooth shape, so that the width gradually decreases along the base symmetry line. A plane going through the basic symmetry line perpendicular to the base plane is called a plane of symmetry. There is a bottom line which initially coincides with the basic symmetry line. The bottom line is moving together with the bended surface. An angle between the bottom line/fraction of the bottom line and the horizontal plane symmetry is called a tilt angle. During the bending process the wider end of the shaped base layer transforms into the required geometrical shape that will be used for fixation of the blade. Because the bending is made around the basic symmetry line, the bottom line of the fixation parts remains its orientation and coincides with the basic symmetry line. The length of the fixation part of the carrying body is much less than the length of the rest of the carrying body. The shape of the fixation part of the carrying body may have different geometrical figures like rectangular, triangular, circle and others depending on design of other fixation parts. The shape of the rest of the carrying body is obtained by simultaneous bending of the carrying body at different points. The shape is determined by mechanical spring forces of the material, its mechanical stress for bending, twisting, and stretching. In one case, the tilt angle is gradually increasing during bending and the carrying body obtains its shape due to intrinsic natural/native shape transformation due to intrinsic mechanical spring/stress/tense forces. When the final shape is obtained, it is fixed by auxiliary mechanical parts, for example, cross bars connecting different points of opposite edges. When the blades are integrated and fixed in the carrying body and fixation frame is connected to the edges of the carrying body, the whole structure remains rigid and stable.

The fabrication process is made in tree steps. First, shaping and patterning the flat matrix/template, for example, a sheet metal in the horizontal plane. Second, 3D shaping of the carrying body by bending of the matrix and fixation of the final shape. Third, integration of the blades and the fixation parts in the carrying body. First fabrication step: after the carrying body is shaped in the horizontal plane, several openings are made in it. The openings/holes can have different geometries and sizes. Number of openings/holes and their geometries depend on the mechanical properties of the material of the carrying body. The holes can have circle, elliptical, and other shapes. The flat patterned layer is bended then until it approaches a required geometry. After fixation of the final shape, a second fabrication step is carried out.

The CB is then partially covered with another film that closes the holes of one part of the frame at one side from the plane of symmetry. There is no difference which half of the holes is covered. Therefore, for simplicity, we will assume that the left-hand holes from the plane of symmetry are covered. The other uncovered holes will be used for providing the reflected air flow to flow outside the device.

Second fabrication step: a first blade is integrated in the carrying body. (The second component of the device/structure is a first blade.) This blade is made of a thin material one edge of which is fixed on the upper edge of the CB, another edge is fixed at the bottom of the CB along the bottom line. Geometry of the blade, therefore, is determined by geometry of the bended shape of the CB. The second blade is integrated in the carrying body. This blade is made of a thin material as well. The first edge of the blade is fixed on the upper projection line. The projection line is the line obtained by geometrical projection of the edge profile line on the plane of symmetry. Another edge is fixed at the side surface of the CB lower to the upper projection line. The upper projection line can be a straight line or a curved line, depending on geometry of the edges of the CB. The fourth component is a fixation structure that increase rigidness of the frame. The fixation structure can be a strip/rope that can be tightened between different points of the upper edge of the CB, or it can be made as a single part such as rigid frame that connects opposite edges of the CB.

The fixation frame increases mechanical strength of the whole structure and prevents possible deformation, compressing and stretching, of the CB. Also, the fixation frame can be used for fixation of the blades. Alternatively, one can use cross bars connecting opposite points of the upper edge of the outer frame. When the components are installed within the CB, the device becomes rigid and stable against external forces like wind, rain, snow, storms. The blades can be made of a variety of materials including metal films, textiles, polymeric films, rubber films, porous materials, and others. The holes of the carrying body beneath the first blade can be closed by applying an additional cover layer material on the surface of the carrying body. It reduces the air friction during rotation and prevents unwanted incident air flow against the direction of rotation. The cover layer cab be made of flexible material. Therefore, it can be applied on the CB before the CB is bent.

The curved wider end of the CB is used for fixation of the IBWT on the rotation rod of the turbine. The fixation part can have a relatively big size along the axis of rotation of the rod to provide a secure fixation. Fixation of the coupled-blades device can be made directly to the rod or via a fixation cylinder. The fixation cylinder provides possibility to disconnect the fast-rotating blades from the rod if the turbine works at its maximum capacity. In other words, there is a possibility to include a gear into fixation part of the coupled-blades device which will allow for more advanced automatic control of the turbine using a computer software control program.

The blades of the IBWT device can be oriented parallel to each other or at different angles. It depends on the specific requirements given by a mathematical algorithm providing correlation to wind directions and number of holes working for each blade. Different orientations of the blades can aim to catch winds from different directions. A preferable relative angle variations between the surfaces of the blades at any cross section (the plane is oriented perpendicular to the bottom line) shall be less than 30%. In the case the blades' surfaces are parallel to each other, the total area of the second blade is around 70% of the surface area of the first blade.

During operation, the incoming wind pushes the two blades of the IBWT simultaneously. The reflected air flow moves aside through the holes of the nut-frame. The first air flow reflected from the first main blade goes through the holes situated under the second blade. The second air flow reflected from the second blade goes through the holes situated above the second blade. So, the two air flows are con interacted to each other. The interaction with outside air particles is also minimal as the two reflected air flows are directed opposite to the direction of rotation.

The two-blade design can be modified to adapt three or more blades within single carrying body. However, the outer frame is to be even wider which is not always practical.

The IBWT device comprises components that are made of thin materials. The nut-frame has many holes that reduce its weight. Therefore, the weight of IBWT cab be significantly smaller than that of traditional blades. Two or more IBWT devices can be installed around the rotational rod. More IBWT sets can be installed along the rod of the turbine. The disclosed design allows us to effectively maintain the IBWT device in a good condition. Maintenance of the device is relatively easy. The damaged parts can be easily replaced with new ones.

Several IBWT can be mounted on the rotation rod at different angles. They can be mounted as a spiral as well. Then the rod can be long, and rotation of the rod around vertical axis can be realized through a circled rale mounted around the vertical axis. This arrangement can be used in both on the ground- and off-shore energy plants.

It is an object to this invention to provide: an integrated blade with coupled blades for wind turbine (IBWT) comprising: a thin curved carrying body; at least a first and a second blade mounted in said carrying body, and supporting/fixation parts, wherein the carrying body has a symmetrical shape against a plane of symmetry, a first and a second edges, and a narrowing prolonged profile where narrowing preferably starts from a widest part of the carrying body and continues towards one end of the carrying body with gradual decrease of a cross section; the first blade being a curved thin structure having a top edge and a lower edge, the top edge being fixed on the first edge of the thin curved carrying body on one side from the plane of symmetry, the lower edge being fixed at a bottom of the carrying body; the second blade being a curved thin structure having a top edge and a lower edge, the top edge being fixed on the plane of symmetry in points where cross lines connecting symmetrical points of the first and the second edges of the carrying body intersect with the plane of symmetry, the lower edge of the second blade is fixed on fixation points in a lower part of the carrying body on an opposite side from the plane of symmetry; and the carrying body has a dense surface on one side from the plane of symmetry and transparent structure for air particles on another side from the plane of symmetry.

It is another object of the invention to provide a method of fabrication of the IBWT, the method comprising producing digital data defining three-dimensional models of thin flat carrying body, a shaped carrying body and an integrated blade;

providing a thin flat template for the carrying body; patterning and shaping/curving material of the thin flat template to form a thin curved carrying body, mounting and fixation of two or more thin blades inside the thin curved carrying body, and mounting of fixation parts on/to the fixation body.

DESCRIPTION OF DRAWINGS

FIG. 11a shows the initial template/blank/billet flat carrying body patterned with openings and a flat cover film of a flexible layer material that is placed on the half surface of the carrying body. The cover film is curved together with the carrying body as shown in FIG. 11b. The 3D drawing corresponds with the line drawing.

DETAILED DESCRIPTION OF THE INVENTION

The invention is now described in details with reference to the appended drawings.

The disclosed integrated blade/IB-wing for wind turbines having coupled blades inside the carrying body allows us to significantly increase the total useful working surface of the IB for more efficient generation of electricity using wind energy. The integrated blade is a multi-surface blade system/structure/device. The larger total useful working surface increases the total rotational momentum resulting in larger power of the wind turbine. The use of thin blades and integration of them inside the same carrying body reduces the total mass of the wing. The carrying body is a curved thin structure with many openings in it that can cover more than 80% of the total surface of the carrying body. The incident wind can come from different directions inside a relatively wide-angle distribution increasing efficiency of the IB device. The large effective working area allows use of relatively slow air flows as well. Therefore, the IB turbines can work longer times.

The coupled blades are thin-surface blades connected within one carrying body. In one embodiment, they are oriented parallel to each other. The carrying body is a thin shaped structure having several openings providing reflected air flow to move outside. The main feature of the IBWT is that the air flow goes inside the carrying body and after interacting with the blades it changes the direction and leaves the carrying body at different angle. The interaction/collision between the incoming air flow and outgoing air flow is minimal.

Figure 1:
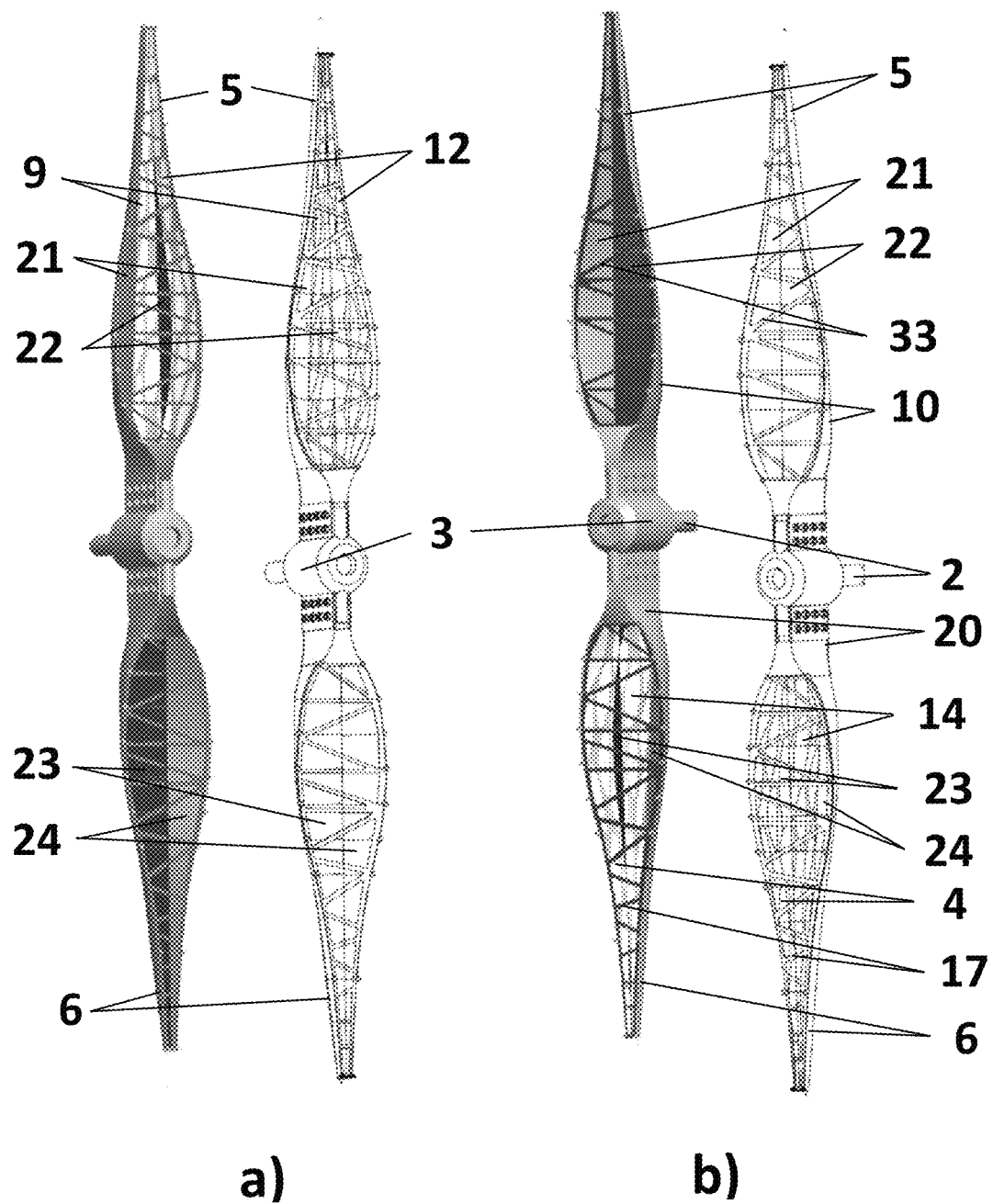
FIGS. 1 a) and b) shows a general view of two integrated blades/two wings mounted on the rotation rod at 180 degrees, each of the integrated blades/wings is equipped with two coupled blades. The 3D illustrations and the line drawings correspond to each other.

In one embodiment, the integrated blade comprises two blades inside the carrying body. FIG. 1 shows two integrated blades 5, 6 connected on the shaft 2 at 180 degrees. The integrated blade 5 (6) consists of a thin curved carrying body 10 (20), two thin curved blades 21, 22 (23, 24), openings 9, 12 (4, 14) and a fixation frame 33 (17). The IB 5, 6 are mounted on rotation shaft 2 via a fixation part 3.

Figure 2:
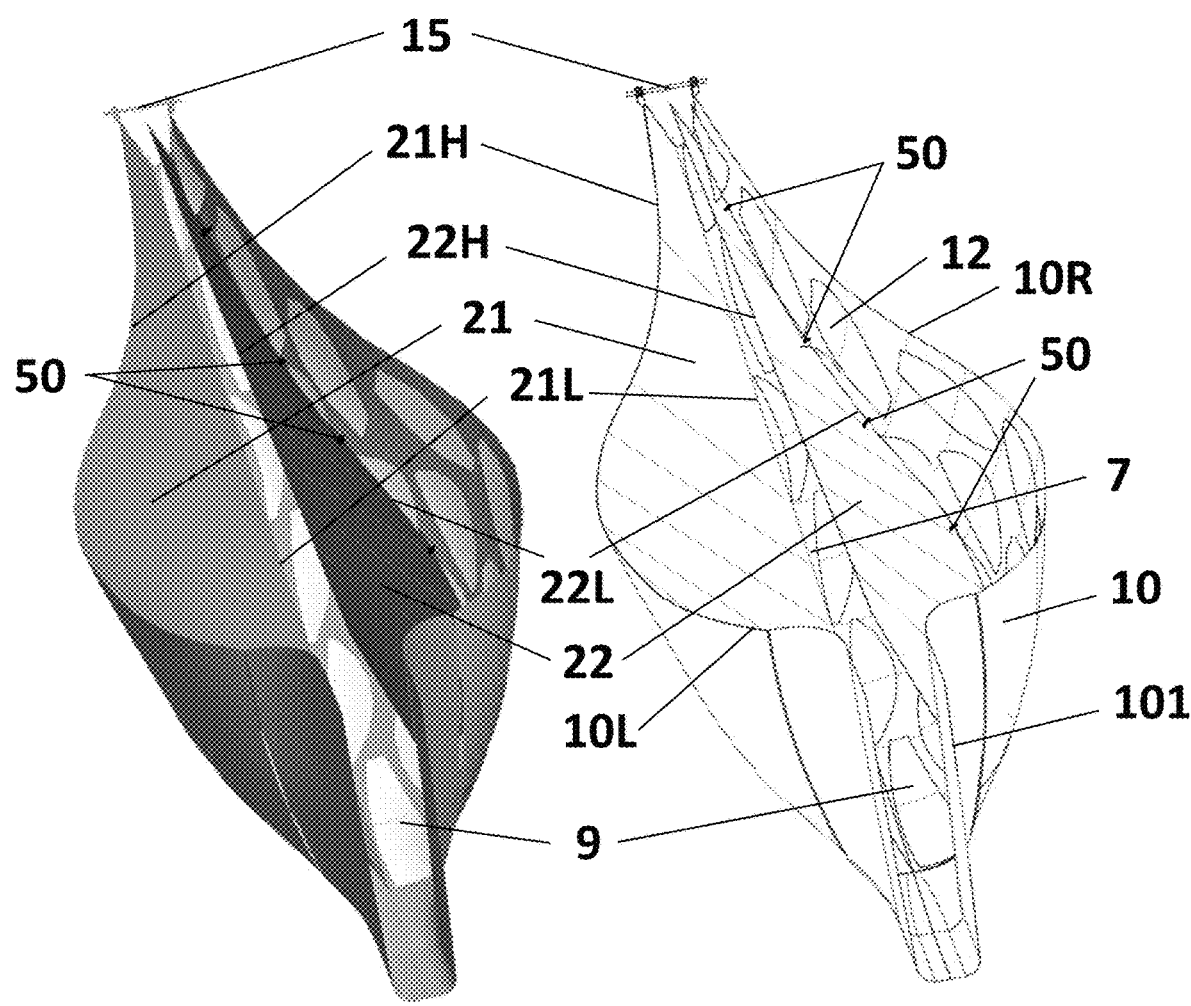
FIG. 2 shows main components of the integrated blade/wing with two coupled blades. The main components include a shaped thin carrying body with openings, and the two blades. The 3D illustration and the line drawing correspond to each other.

FIG. 2 reveals basic component of the integrated blade comprising two thin curved blades. The construction comprises a curved carrying body 10 having openings 9, 12, the blades 21, 22, a fixation bar 15 at the narrow end of the carrying body. The openings 9, 12 are made in the carrying body. The openings 9 are situated in-between the blades 21 and 22, and the openings 12 aside the blade 22 starting from the lower edge of the second blade 22L between the blade 22 and the carrying body 10 and the edge 10R of the carrying body. The blades 21, 22 are fixed in the carrying body 10 so that the top edge 21H of the first blade 21 coincides with the edge 10L of the carrying body and another edge of this blade 21L is fixed on the bottom 7 of the carrying body. The top edge 22H of the second blade 22 is fixed above the lower edge 21L, preferably, near the surface connecting the edges 10L and 10R. Another edge 22L of the blade 22 is fixed on the hollow side of the carrying body below the edge 22H at fixation points 50 of the carrying body.

Figure 3:
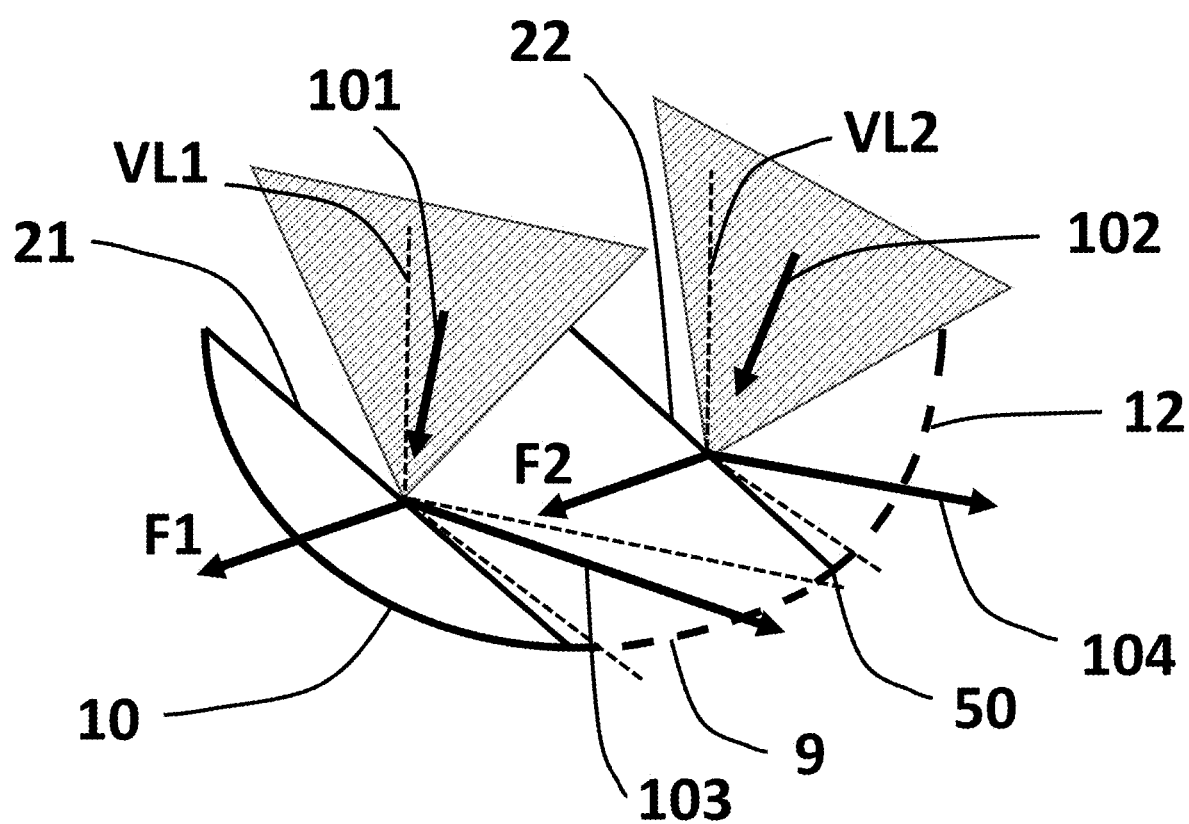
FIG. 3 demonstrates the main physical/working principles of the coupled blades shown on a cross section.

FIG. 3 demonstrates the main physical/working principles of the two coupled blades. The figure is a vertical cross section which is oriented perpendicular to the bottom line of the carrying body. The curved line is a profile of the carrying body 10. Accordingly, the straight lines are intersections of the blades 21, 22 with the vertical plane (plane of the cross section). The curved dashed lines show openings 9 and 12. The fixation point 50 of the carrying body for connection of the lower edge 22L of the blade 22 is shown. Arrows 101 and 102 exhibit incoming air flows, and arrows 103, 104 exhibit reflected air flows. The incoming air flows cause mechanical pushing forces F1 and F2. The reflected air flows go through the openings 9 and 12 outside.

The dushed triangles in FIG. 3 show angle distribution of the incoming air flow that creates the pushing force enabling rotation of the integrated blade. The forces F1 and F2 produce as angular momentum for rotating blades as pushing force along the vertical lines VL1 and VL2 for statical blades. Both physical mechanisms can be used for producing energy.

Figure 4:
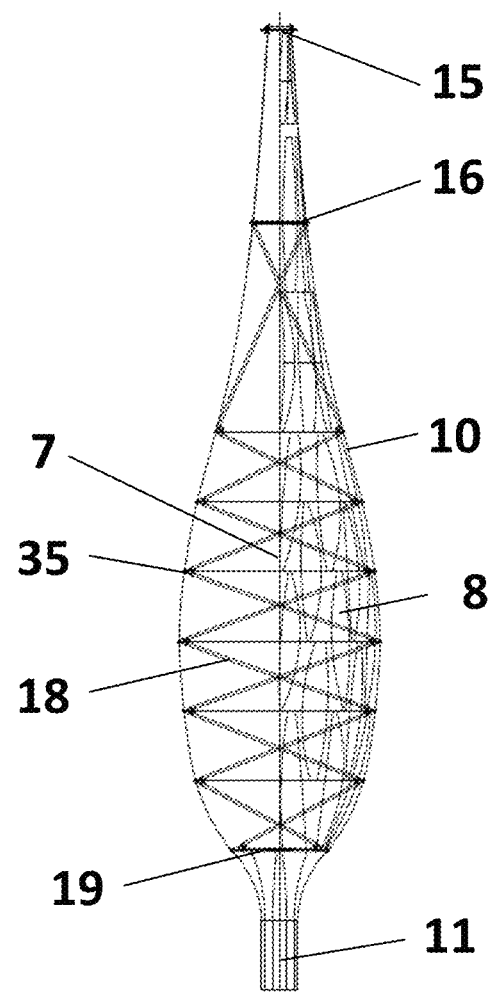
FIG. 4 shows a top view of the carrying body with fixation parts.

FIG. 4 shows an example of fixation of the shape of the carrying body. The fixation is made by tightening a belt between different points at the edges of the carrying body. The carrying body 10 has a fixation end 11 (fixation end of the carrying body), fixation part 50, and openings 8. The bottom line 7 of the carrying body is used for fixation of the blade. The opposite edges of the carrying body are connected with cross bars 15, 16, 19 connecting opposite points of the edges at different places/locations. The main wider shape of the carrying body is fixed with a belt/strip/rope 18 which is tightened between the cylinders/tubes/hooks 35 (or openings in the carrying body) fixed on the edges of the carrying body at different locations.

Figure 5:
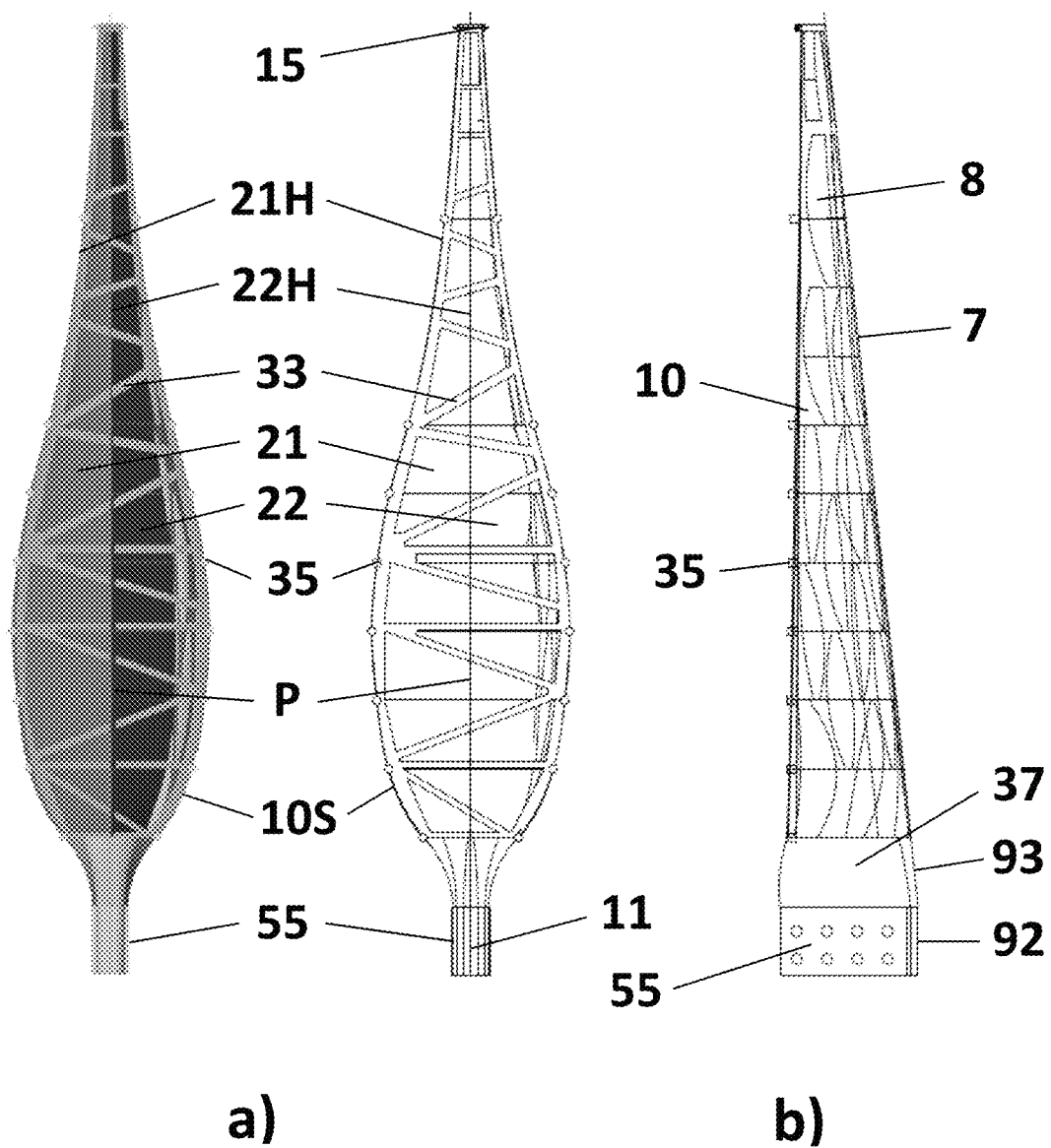
FIGS. 5 a) and b) shows a top view and a side view of the wing having two coupled blades integrated in the carrying body with a frame fixing the two opposite edges of the carrying body and the top edges of the blades. The bottom line is a straight line having a tilt angle relative to the initial axis of symmetry. In 5a) The 3D illustration corresponds to the line drawing.

FIG. 5 shows the integrated blade consisting of the carrying body 10, two blades 21, 22 and a flat fixation frame 33. FIG. 5a shows a top view of the construction/structure. FIG. 5b shows a side view. The shape of the carrying body 10 can be divided in three fractions/sections, the fraction/section 10S (fraction/section of the carrying body) covering most of the carrying body 10, the fixation end 11 and the intermediate fraction/section 37 (intermediate fraction/section of the carrying body) in-between the sections 10S and 11. The bottom line of the carrying body accordingly consists of three fractions. The first fraction bottom line 92 corresponds to the bottom of the fixation end 11, the main bottom line 7 of the carrying body 10 is a straight line here, and an intermediate fraction bottom line 93 of the intermediate section 37. The whole construction/structure becomes rigid and stable against deformation. Practically, the shapes 10S and 11 are defined in a device design. The shape of the intermediate section 37 with the intermediate bottom line 93 are naturally obtained during deformation process of the carrying body. In addition to natural deformation, some material stretching process can be used to obtain proper geometry. The structure of the blades in FIG. 5 is symmetrical against the plane of symmetry P. The symmetrical structure is practical for manufacturing procedures. But other non-symmetrical shapes as well as curved bottom lines and more complex geometries of the upper edges can work too.

The fixation frame 33 can have different geometries. FIG. 5 shows one of possible designs. The fixation frame has shape of the edges of the carrying body and there are few bars connected at different angles within the frame. Basically, the connection frame consists of a number of relatively narrow bars with large open areas in-between the bars so that the air flow can go through the frame. The bars connect the opposite edges of the carrying body 10. Here, there are plenty of different angles between the bars so that they can compensate possible deformation of the carrying body during operation of the device.

Figure 6:
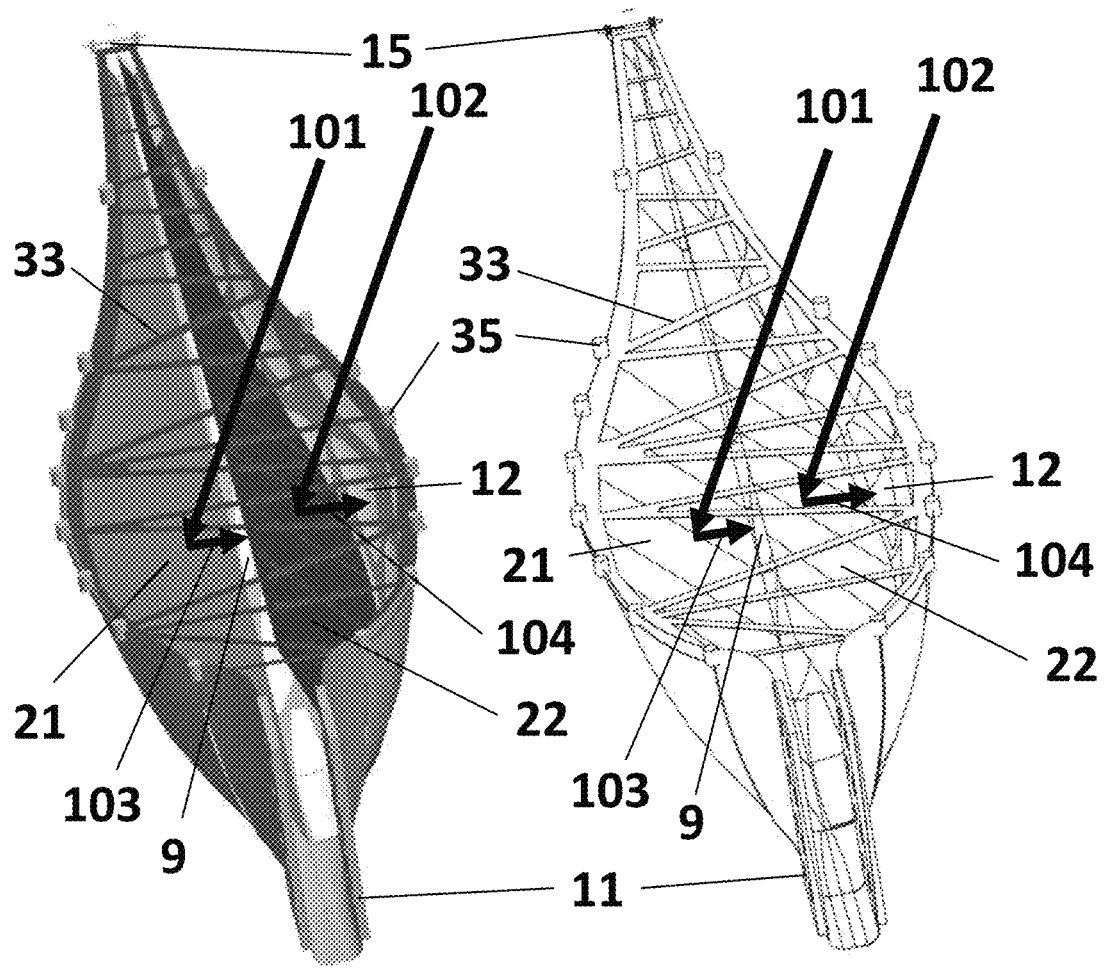
FIG. 6 shows a general view of the wing with two coupled blades and the top fixation frame. Arrows show incident air flow forcing on the blades and reflected air flows which go through the openings. A profile of the fixation end of the carrying body has a rectangular-like shape with two parallel surfaces. The 3D drawing corresponds with the line drawing.

FIG. 6 demonstrates the integrated blade from different view angle to demonstrate the working principle. The integrated blade comprises the same components as in FIG. 5 a, b but some more features can be seen in this figure. The integrated blade comprises the carrying body 10, two blades 21,22 and a top fixation frame 33. Air particles of the incoming air flows 101, 102 collide onto the blades 21, 22 producing the rotational momentum. The reflected air flows 103, 104 go outside through the openings 9, 12. The incoming air flows and the reflected air flows are separated. The reflected air flow 103 (reflected from the blade 21) is shadowed from the incoming air flow by the blade 22. The incoming air flow 101 is interacting with the blade 21 and the incoming air flow 102 is interacting with the blade 22. The openings in the carrying body 10 are divided in two sets. The first set of openings 9 is situated in-between the two blades 21,22 and provide the reflected from the blade 21 air flow 103 to go through these openings outside without collision with the incoming air flow 104. The second set of openings 12 is situated aside the blade 22 above its lower edge 22L and provide the reflected from the blade 22 air flow 104 to go through these openings outside. The top edge 22H of the blade 22 is fixed in the frame 33 along the top central line above the lower edge 21L of the blade 21. The lower edge 22L of the blade 22 is fixed on the right side of the carrying body 10.

Figure 7:
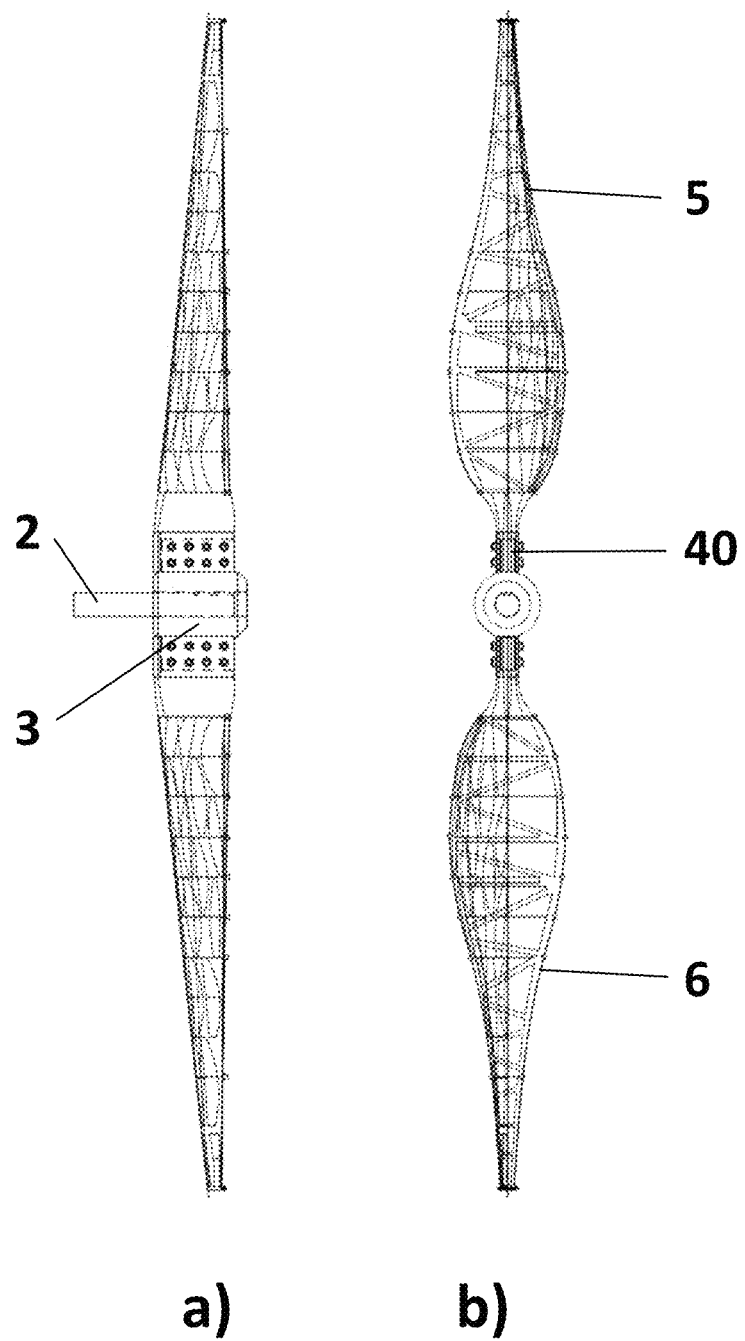
FIGS. 7 a) and b) shows the top view and the side view of the two wings mounted on the rotation rod at 180 degrees. Each carrying body has a straight bottom line and a straight top line corresponding to the projection of the surface of the carrying body onto the plane of symmetry. The profile of the fixation end of the carrying body has a rectangular-like profile.

FIG. 7 shows possible fixation of two integrated blades 5, 6 on the shaft 2 of a turbine. The fixation is made by rectangular-shape connection parts 40 mounted on the fixation part 3 which is connected to the shaft 2. FIG. 7a is a side view of the arrangement revealing a simple secure connection of the integrated blades. FIG. 7b is a top view of the arrangement. The rectangular-like shape of the connection part has a smallest possible cross section area for reducing air resistance during rotation.

Figure 8:
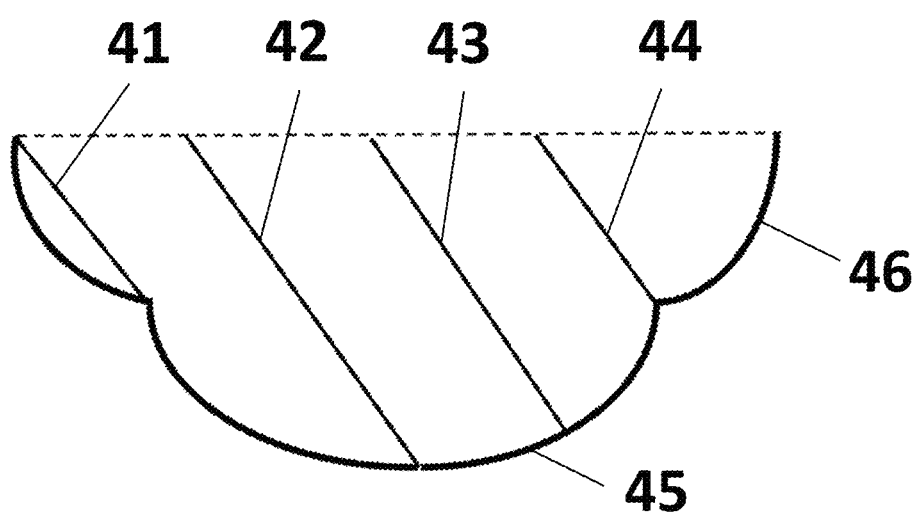
FIG. 8 shows an example of a different design of the carrying body with more than two blades inside it. The cross section reveals a more complicated shape of the carrying body having four blades inside.

FIG. 8 reveals another possible design of the integrated blade. The picture is a cross section of the arrangement. The carrying body has a shape that can be divided in two curved section lines 45, 46 of the carrying body. There are four blades 41, 42, 43, 44 integrated inside the carrying body. This figure demonstrates that several blades can be integrated within the same carrying body.

Figure 9:
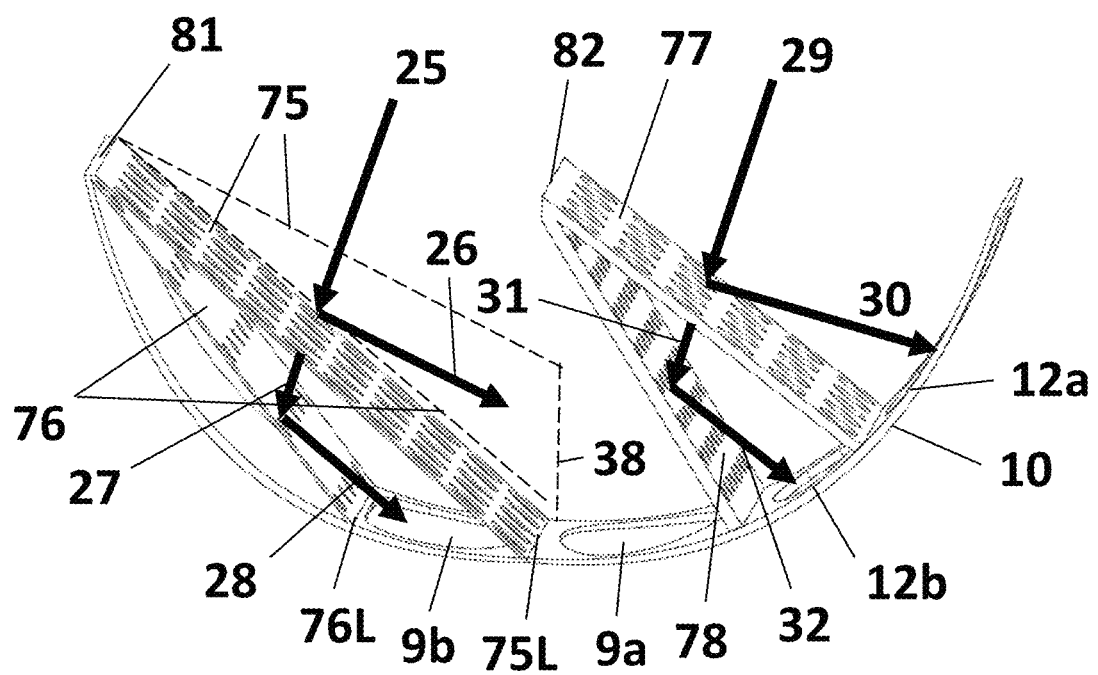
FIG. 9 reveals working/physical principles of low-density blades (also called here soft type blade). These blades reduce the reflected air flow because a significant part of the incident air flow goes through the blades. In order to use these blades more effectively, addition blades of higher density are added behind/below the low-density blades. The added higher density blades (also called here solid type blade) use the transited/transmitted/translated air flow for additional increase of the total pushing force. This solution splits the reflected air flow reducing possible formation of vortices causing friction outside the wing.

The use of thin blades makes it possible to use different materials having different structure and density. FIG. 9 demonstrates an integrated blade in which the blades have low and high effective density (soft type blades and solid type blades, respectively). The low effective density can be a property of material having low density, or fiber material which consists of filaments/threads/yarn or it can be obtained by patterning a high-density film, for example, a thin sheet metal, with openings/holes. The soft type blades can be made of material selected from a group consisting of thin sheet metal patterned with small holes having diameters ranging from 0.01 mm to 3.0 mm multiplied by number of meters of the length of the blade, fibers of polymers, and solid porous material.

The integrated blade shown in FIG. 9 consists of two pairs of blades 75, 76, 77, 78. These blades are preferably thin ones. Preferably the blades have a thickness of 0.3-1.0 mm. The blades 75, 77 have low effective density allowing the incoming air flows 25, 29 to partially penetrate/go through across the surface of the blades. One can consider the interaction process as a non-elastic collision process when the energy of the reflected air flows 26, 30 are lower than the energy of the incoming air flows 25, 29. The penetrated air flows 27, 31 interact with the blades/sub-layers 76, 78 having higher densities. The reflected air flows 26, 28, 30, 32 go through the openings in the carrying body 10 outside. The openings are split into four sets 9a, 9b, 12a and 12b that work for the blades 75, 76, 77, 78 accordingly. The blades 75, 76 are fixed along a common fixation line 81 but have different tilt angles. The blades 77, 78 are fixed along the fixation line 82 and have different tilt angle too. This arrangement allows as to reduce the interaction between the incoming air flows and the individual blades avoiding possible fast changes of the angular momentum and also reducing interaction between the incoming air flows with reflected air flows reducing possible formation of vortices. The blades 75,76 can be oriented so that the lower edge 75L of the blade 75 is fixed to the bottom of the carrying body and the low edge 76L of the blade 76 is fixed at the carrying body aside from the plane of symmetry. Alternatively, the blade 75 can be oriented so that its lower edge 75L lies on/near the plane of symmetry above the bottom of the carrying body as shown by dashed line in FIG. 9. In this case the blade 76 can be oriented so that its lower edge 76L is fixed to the bottom of the carrying body as shown by dashed line in FIG. 9. For this last arrangement some addition mechanical parts, for example, bars 38 can be added for fixation of the low edge 75L of the blade 75. The blade 75 can be oriented in the angle range between the above two orientations. The fixation position of the lower edge 75L changes accordingly from the bottom of the carrying body upwards. The blade 76 can be oriented in the angle range between the above two orientations as well. The fixation position of the lower edge 76L changes from the bottom of the carrying body along the profile of the carrying body aside of the plane of symmetry accordingly.

In one embodiment, the blades can be made of a material having high density. This provides a nearly elastic reflection of the incoming/incident air flow.

In the other embodiment, at least one of the blades, preferably, the first blade, is made of material having lower density so that a portion of the incident air flow, preferably 5 to 20%, go through the thin material. The interaction between the blade and the incident air flow is non-elastic. This reduces the amount of the reflected air particles which can collide with the incident incoming air particles causing reduction of energy of the incoming air flow. There can be a few semi-transparent low-density blades the upper edges of which are fixed on the same upper edge of the carrying body directed at different angles and non-intersecting to each other. Then the first main incoming air flow 25 interacts with the first blade 75, the transmitted air flow 27 interacts with the blade/sub-layer 76. Semitransparency of the blades can be obtained by adding opening in the blades or the material may have a porous structure itself.

Figure 10:
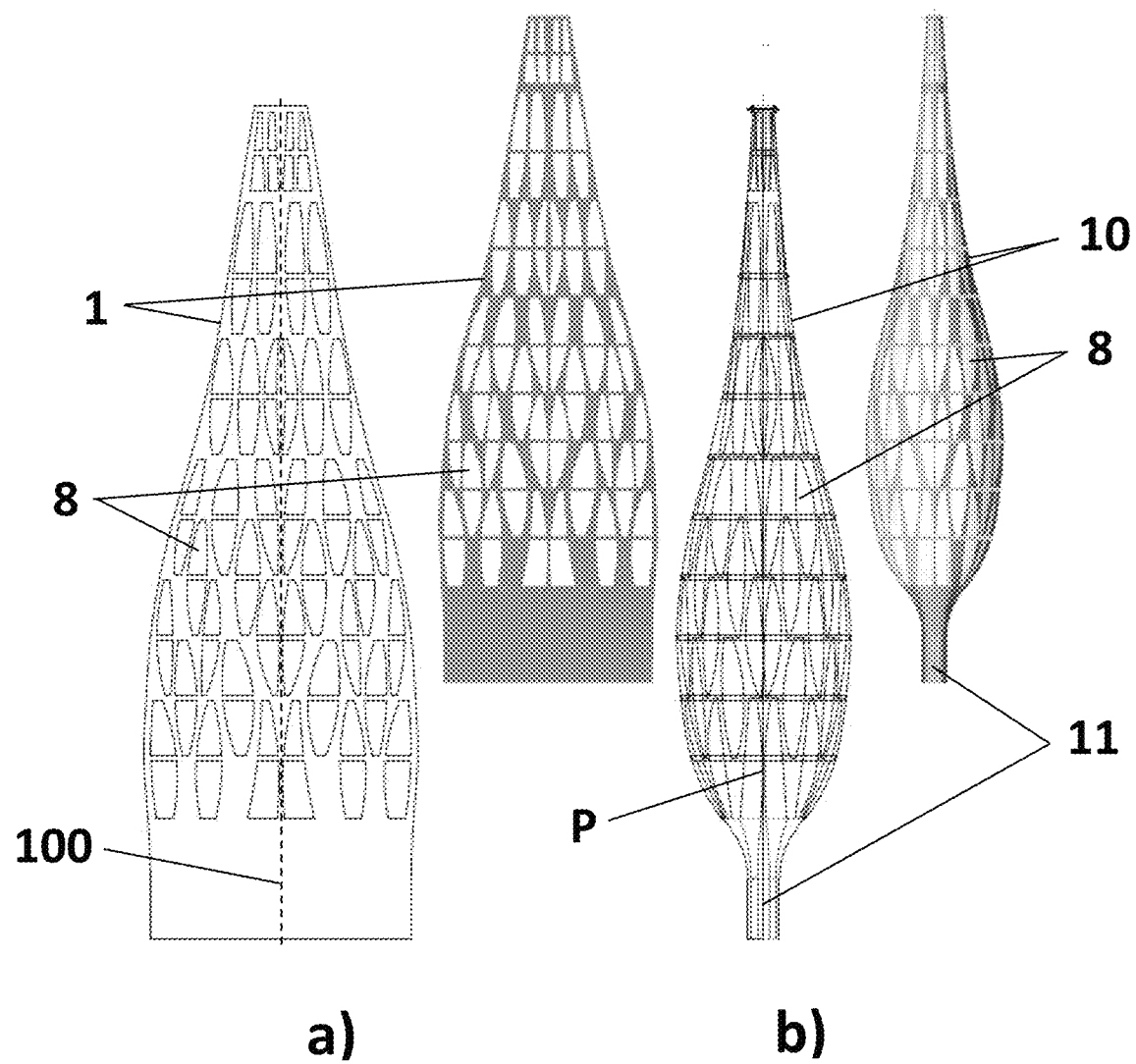
FIGS. 10 a) and b) shows the formation of the carrying body from initial flat template. The shaped flat template patterned with openings (FIG. 10a) is bent to a curved shaped carrying body (FIG. 10b). The final shape can vary when applying different distribution of external forces. The 3D drawing corresponds with the line drawings.

Fabrication/manufacturing of the integrated blade is carried out in three steps. The first step is patterning and shaping of the carrying body. FIG. 10a shows a flat template 1 having a set of openings 8. The outer edges of the template 1 are symmetrical about the axis of symmetry 100. The openings may have different geometries. They can be symmetrical as shown in FIG. 10a. This allows to easier obtain symmetrical shapes of the curved carrying body. The curved carrying body 10 is obtained by bending the template 1 symmetrically against the plane of symmetry P that intersects the axis of symmetry 100 and oriented perpendicular to the horizontal plane. The carrying body has two shapes, the main shape and the fixation end 11. The fixation end is used for mounting the carrying body with the blades on a rotation shaft.

Figure 11:
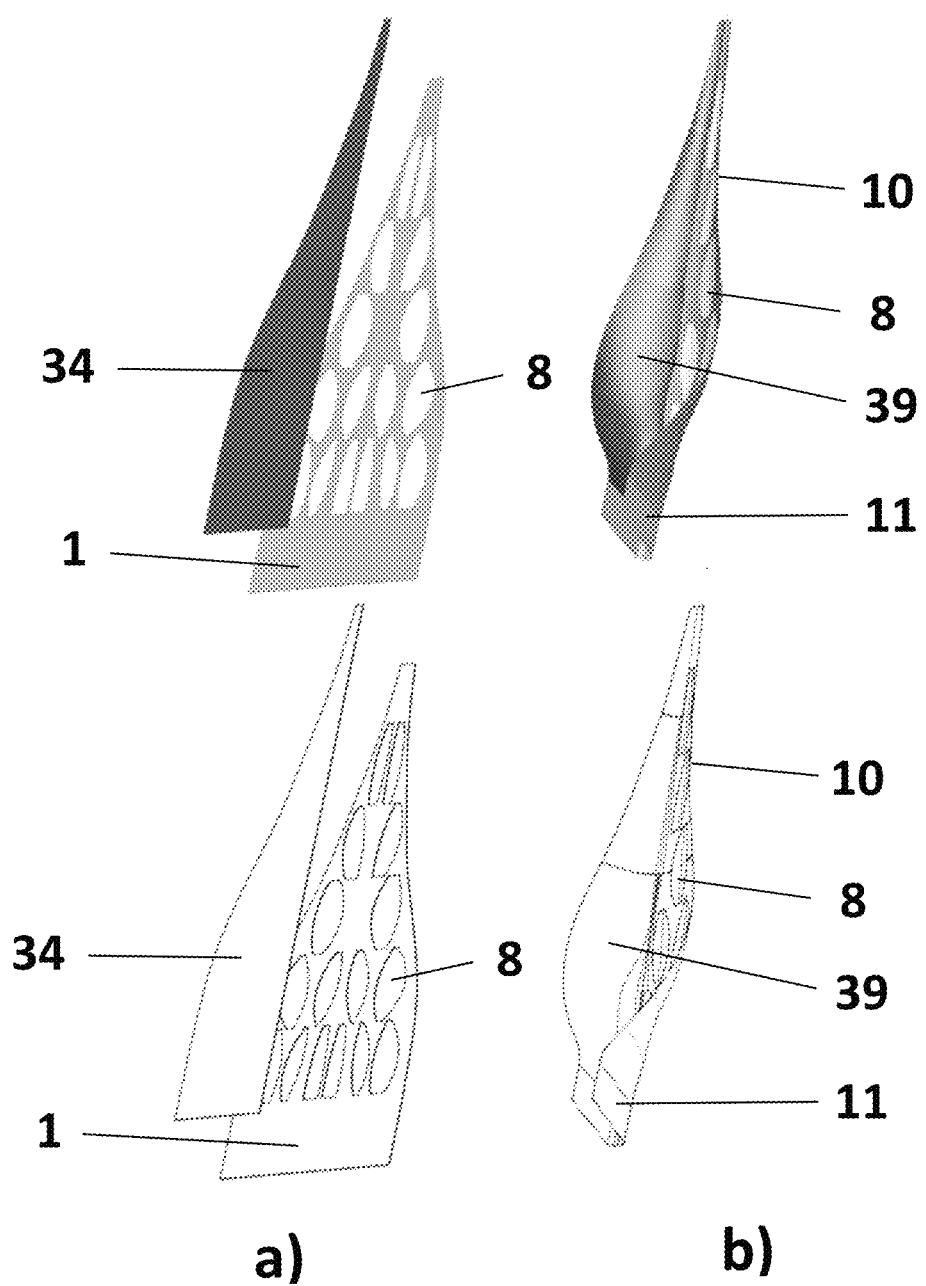
FIGS. 11 a) and b) shows the formation/shaping of the carrying body from a flat template/blank/billet layer. As the working openings are used only from a part/half part of the carrying body, the rest of the openings are covered with a film. The covering film can be deposited/applied before the bending fabrication/manufacturing step.

The openings of only one side of the carrying body are used. Therefore, the openings on the other side can be covered with another layer after the completion of the integration process. Or, alternatively, the unused openings can be covered on the template. FIG. 11a) shows the template 1 and a cover film/layer 34 which is deposited/glued/placed on top of the template. During the bending process the cover layer bends together with the template. FIG. 11b shows the carrying body 10 with openings 8 and fixation part 11 after the bending process is completed. The openings on one side of the carrying body are covered with the cover film/layer 39.

After the bending process is completed, the blades and fixation parts are integrated/assembled in the carrying body.

Figure 12:
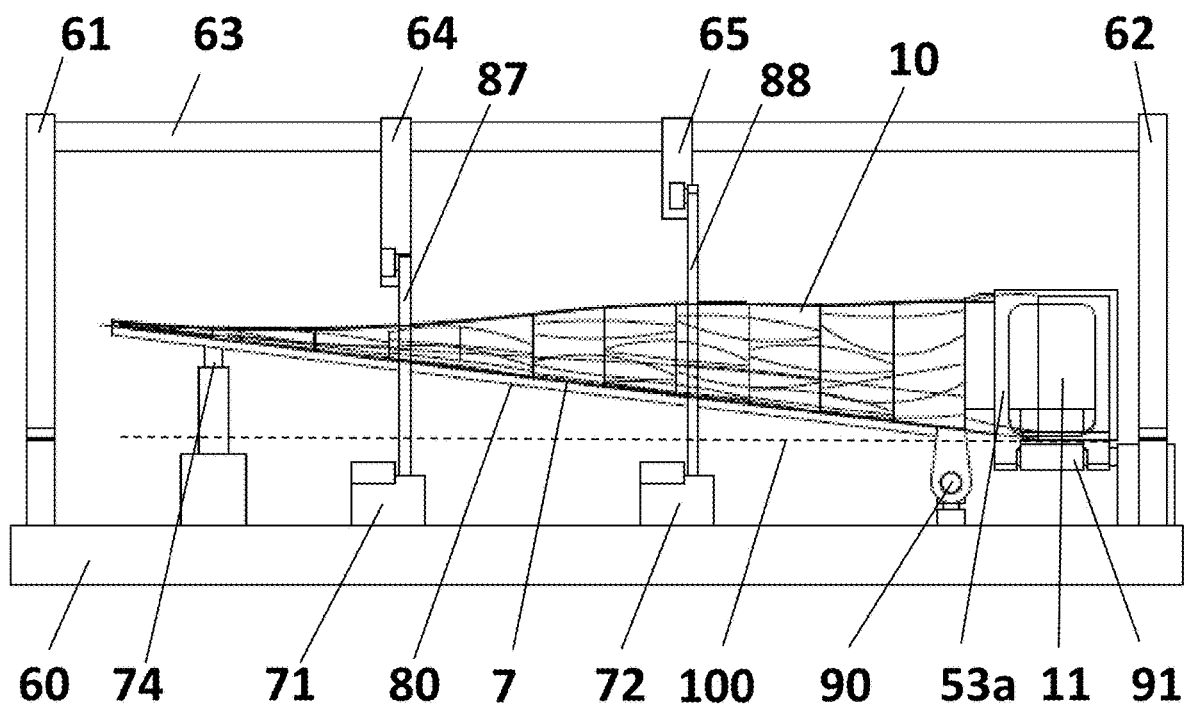
FIG. 12 a), b) Shows machinery and devices for shaping of the carrying body. It comprises main components that allow gradual shaping of the flat blank/billet carrying body using distributed external forces. The template/blank patterned flat carrying body is placed on two parts, a main flat platform and a bending mechanism for shaping the fixation profile of the carrying body. Initially the surfaces of the platform and the bending mechanism for shaping fixation profile lie in the same horizontal plane. The platform is provided with a tilting mechanism. The tilting occurs together with bending of the shape. During the shaping process the platform tilts against the horizontal plane. The shaping of the fixation profile of the carrying body is carried out by rotating two opposite pressing parts around horizontal axis which is oriented parallel to the initial axis of symmetry of the template/blank flat carrying body. Shaping of the main part of the carrying body is carried out by bending a few sections of the template/blank layer. The deformation is made, for example, by tightening a belt/stripe that goes from a ruling mechanism to cylinders above the carrying body and further beneath the carrying body in the plane perpendicular to the plane of symmetry. There can be more than two belts/strips for shaping long structures. In the figure there are two belts/strips. Practically there can be three or even more belts/strips to distribute forces among different sections of the bended surface to obtain a more accurate/precise shape required. The belt tightening mechanism allows us to use the material's intrinsic spring forces that provide a natural deformation of the shape.
Figure 12:
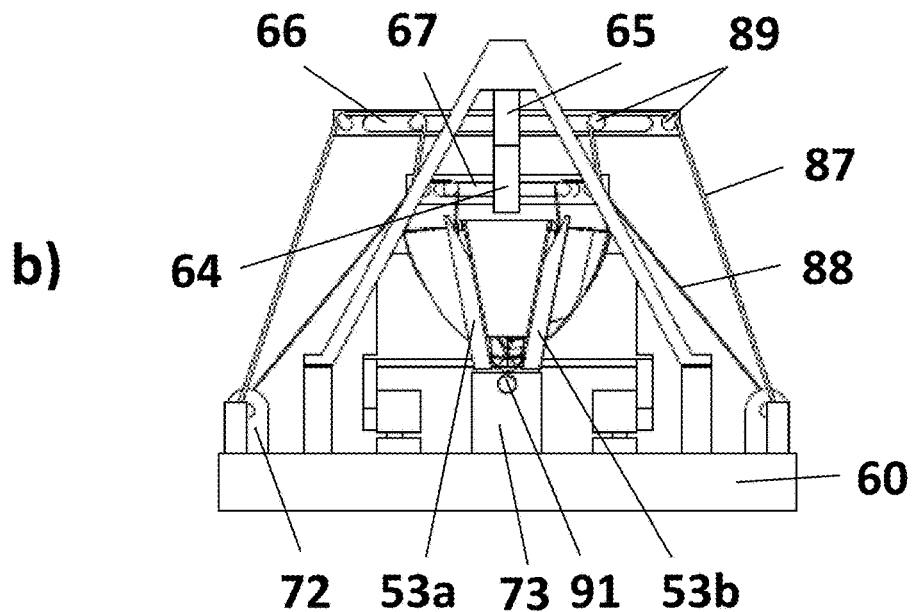

FIGS. 12-16 demonstrate machinery and devices/instruments for fabrication/manufacturing of the integrated blade. The template 1 is placed on a platform 80. A wider end of the template is placed on the bending mechanism for shaping the fixation end of the carrying body. The bending mechanism comprises two pressing parts 53a and 53b connected to a shaft 91 and a rotational mechanism 73. The rotation mechanism provides rotation of the pressing parts 53a and 53b clockwise (part 53a) and anticlockwise (part 53b) or vice versa for bending the fixation end 11. FIG. 12 shows two side views, FIG. 12a and FIG. 12b, of the machinery with the carrying body. The machinery is placed on the base 60. The platform 80 can be titled around a shaft 90 which is oriented perpendicular to the plane of symmetry in the horizontal plane. The tilting of the platform 80 can be made, for example, by lifting the end of the platform 80 by a lifting mechanism 74, for example, using a piston with a lifting rod/shaft oriented vertically using pneumatic or hydraulic forces. The bending mechanism for formation of the fixation end consists of two pressing parts 53a and 53b rotating around shaft 91. For simplicity, below we will refer to only one pressing part number 53. One of the parts 53 rotates clockwise and another part 53 rotates anticlockwise. The shaft 91 is oriented horizontally and lies in the vertical plane of symmetry. The rotation of the pressing parts 53 is carried out by a rotation mechanism 73. The final shape of the fixation end 11 of the carrying body 10 depends on the rotation angle and the shape of the pressing parts. The shaping of the main carrying body 10 is made by bending of the template by, for example, tightening belts in a few sections perpendicular or near-perpendicular to the plane of symmetry. The carrying construction for the devices comprises two carrying vertical frames 61, 62, a horizontal bar 63 one end of which is fixed on the frame 61 and another end is fixed on the frame 62. The bar 63 goes over the entire length of the carrying body 10. There are a few T-shaped structures mounted on the bar 63. FIG. 12*a* shows two such structures 64, 65 having cross bars 67, 66 accordingly supplied with rollers 89 for sliding the belts 87, 88. The T-shaped structure 65, 66 with the belt 88 is used for shaping the widest section of the carrying body 10. Another T-shaped structure 64, 67 with the belt 87 is used to shape the rest of the carrying body and is placed on the optimal position. The belts 87, 88 are connected to rolling devices 71, 72 accordingly, they go to the rollers and then beneath the carrying body symmetrically to the plane of symmetry. The tightening of the belts is carried out decreasing length of the belts which force the carrying body to shrink/bend. The bottom of the carrying body can be fixed to the platform 80. The cross bars 66, 67 can be supplied with grooves enabling the rollers to be moved along the grooves to set the right/optimal positions of the rollers. The tilting of the platform is correlated to the tightening the belts and rotation of the pressing parts. This correlation can use intrinsic spring/tense forces of the material of the carrying body (CB). At the beginning of the bending process the flat template lies horizontally on the platform 80 along the axis of symmetry 100 so that the shaft 91 oriented parallel to the axis of symmetry 100. During deformation the bottom line 7 of the carrying body tilts against the initial axis of symmetry 100 of the flat template whereas the bottom line of the fixation end remains coincident/parallel with/to the axis of symmetry 100. After the bending is completed, the outer surface of the CB with cover layer on it can be finally painted with a protective film. The protective film can include nanoparticles and compounds, for example, alloys based on clusters of TiO2 molecules with reactive particles, radicals based, for example, on oxygen-hydrogen radicals sensitive to UV light, treated/illuminated with UV light, that can form stable films against high and low temperatures, temperature gradients, humidity, dust, chemicals in the air. After the final shape of the CB is obtained and the blades and the fixation parts are mounted in the CB, the belts are released and the IBWT is ready for use.

There can be different machinery arrangements to perform bending of thin templates which should not limit us to use this invention. Here we reveal the main principles based on physics, mechanics, materials science and mechanical design.

Figure 13:
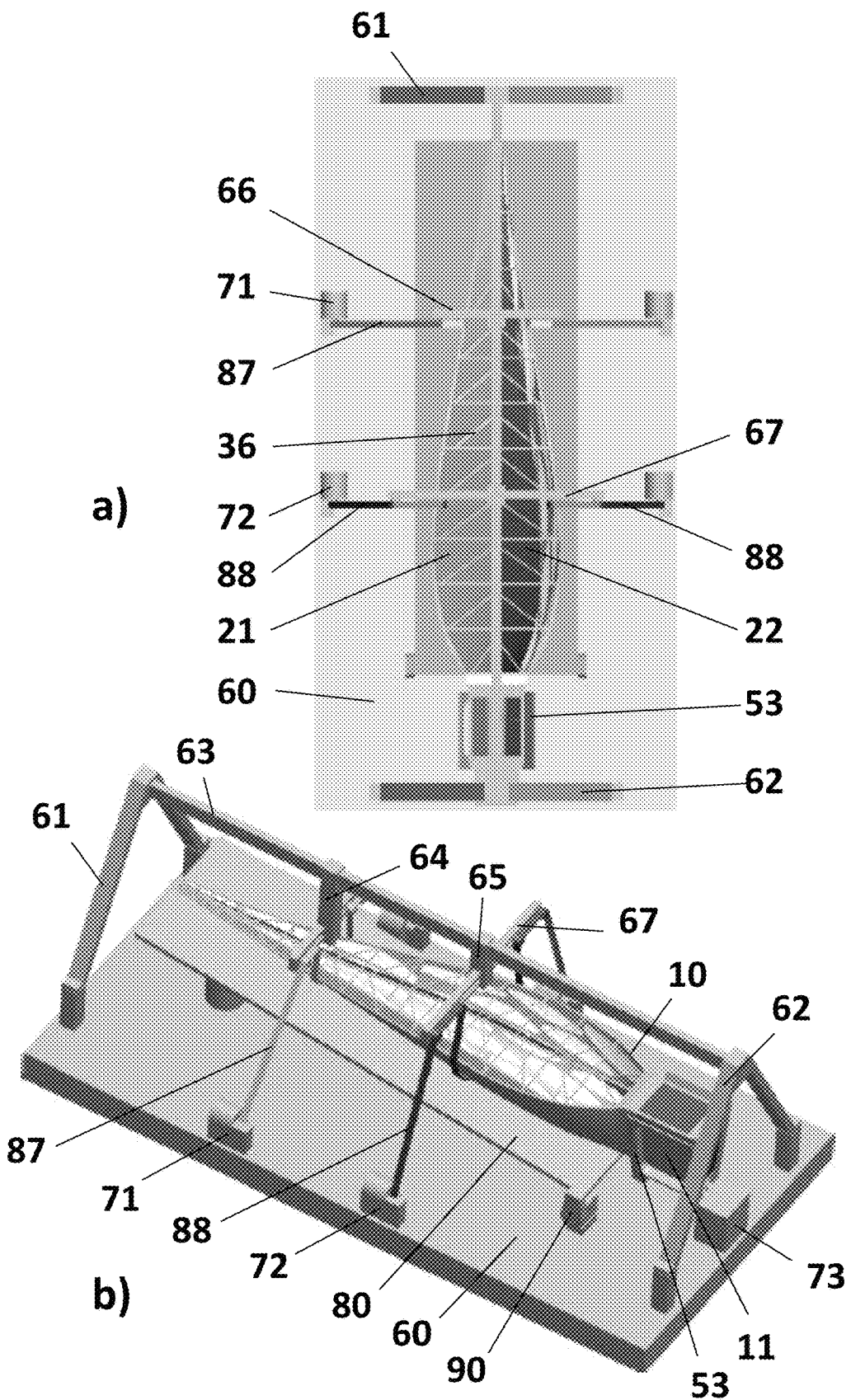
FIGS. 13 a) and b) shows the bending machinery, the same as in FIG. 12, but includes a general view and a top view with different grey scales so that the blades and other parts can be easier seen/distinguished in/on the figures.

FIG. 13 shows a top view of the fabrication machinery FIG. 13*a* and a general view FIG. 13*b*. In addition to the components shown in FIG. 12 the blades 21, 22 and the fixation frame 36 are integrated in the carrying body 10.

Figure 14:
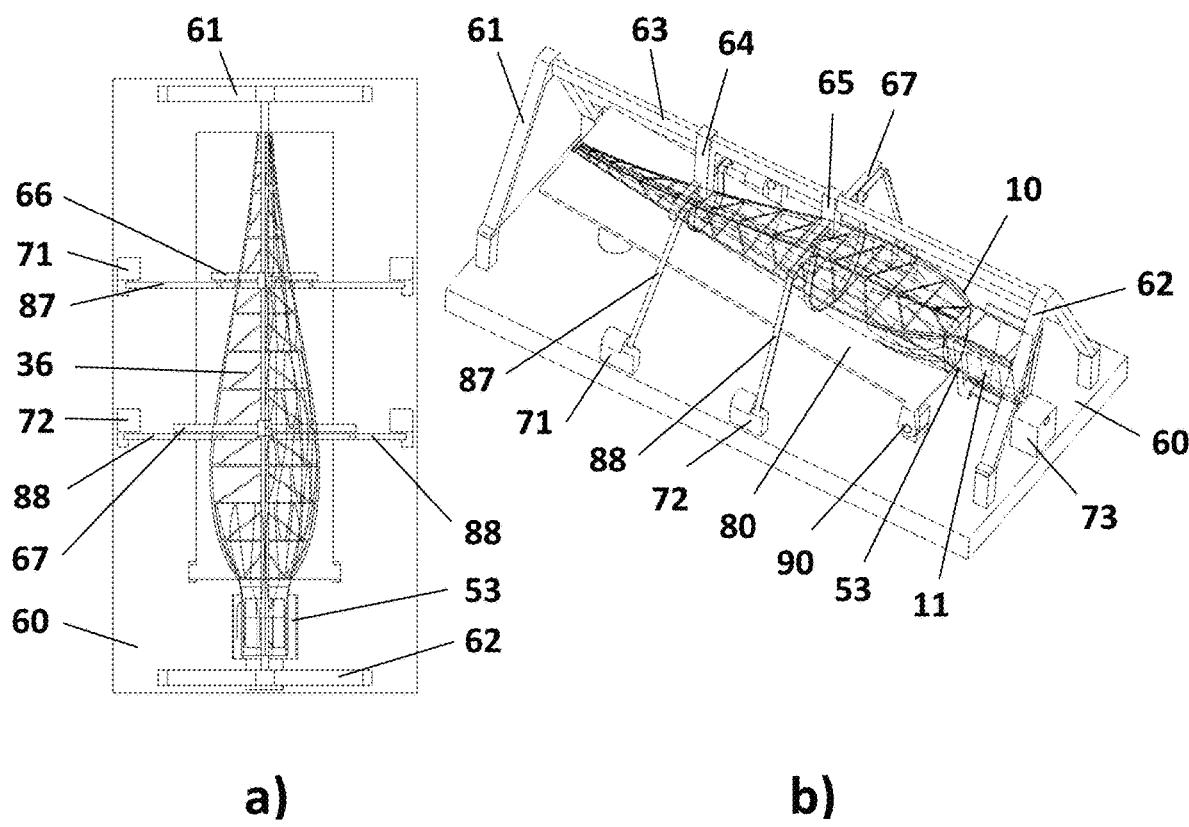
FIGS. 14 a) and b) shows two drawings of the machinery, a top view and a general view. This figure shows how the parts are connected to each other, particularly, how the belts go from the ruling mechanism to the upper cylinders and then beneath the carrying body.

FIG. 14 shows a top view of the fabrication machinery FIG. 14*a* and a general view FIG. 14*b*. The pictures are shown as drawings. In addition to the components shown in FIG. 12 the fixation frame 36 is integrated in the carrying body 10. Particularly, FIG. 14*b* reveals the belts 87, 88 going beneath the carrying body 10.

Figure 15:
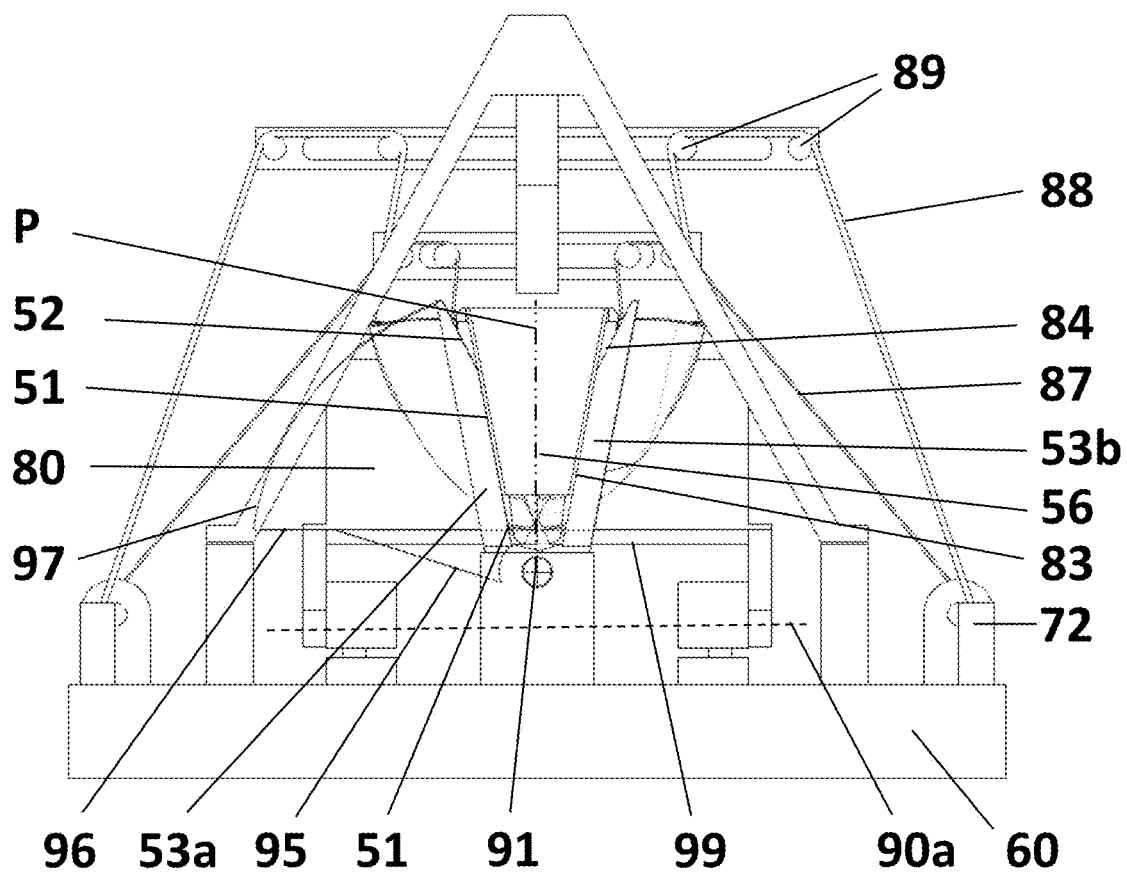
FIG. 15 shows the side view of the machinery where the main elements of the bending mechanism for shaping the fixation end of the carrying body is demonstrated. The figure demonstrates the initial positions of the components and the flat template before the bending starts. A separate mechanism for formation of shape of the fixation end of the carrying body allows obtaining the required fixation geometry.

FIG. 15 shows a mechanism of the formation of the fixation end of the carrying body. In order to obtain a required shape of the fixation end of the carrying body 10, two pressing parts 53*a* and 53*b* with required facing shapes are used. These parts rotate around the shaft 91 and squeeze the two sides of the fixation end of the carrying body forcing them to bend and obtain the shape of the fixation plate 56. At the beginning of the bending process, the template of the carrying body is places on top of the platform in the horizontal plane. Here the horizontal plane is presented by the intersection line 99 obtained from intersection of the horizontal plane with the vertical plane perpendicular to the plane of symmetry. Because the axis of the shaft 91 is placed below the horizontal plane, the facing surfaces of the pressing parts 53*a* and 53*b* contacting with the carrying body have two facets each, 51, 52 and 83, 84. Before the bending starts, the template is placed in the horizontal plane and the facets 52 and 84 are oriented horizontally facing/contacting the template. The other facets are tilted to the horizontal plane. The initial position of the facet 51 is indicated by the line 95 and the initial position of the facet 52 is shown by the line 96. The facets 83, 84 are oriented symmetrically to 51, 52. At the beginning when the template is in the horizontal plane, the template is in contact with the facets 51, 83. During the bending process the platform 80 tilts around axis 90*a* (axis of shaft 90) and at the final stage the facets 52, 84 are in contact with the carrying body 10. The bending of the fixation end of the carrying body is carried out until its profile coincides with the profile of the fixation plate 56.

Figure 16:
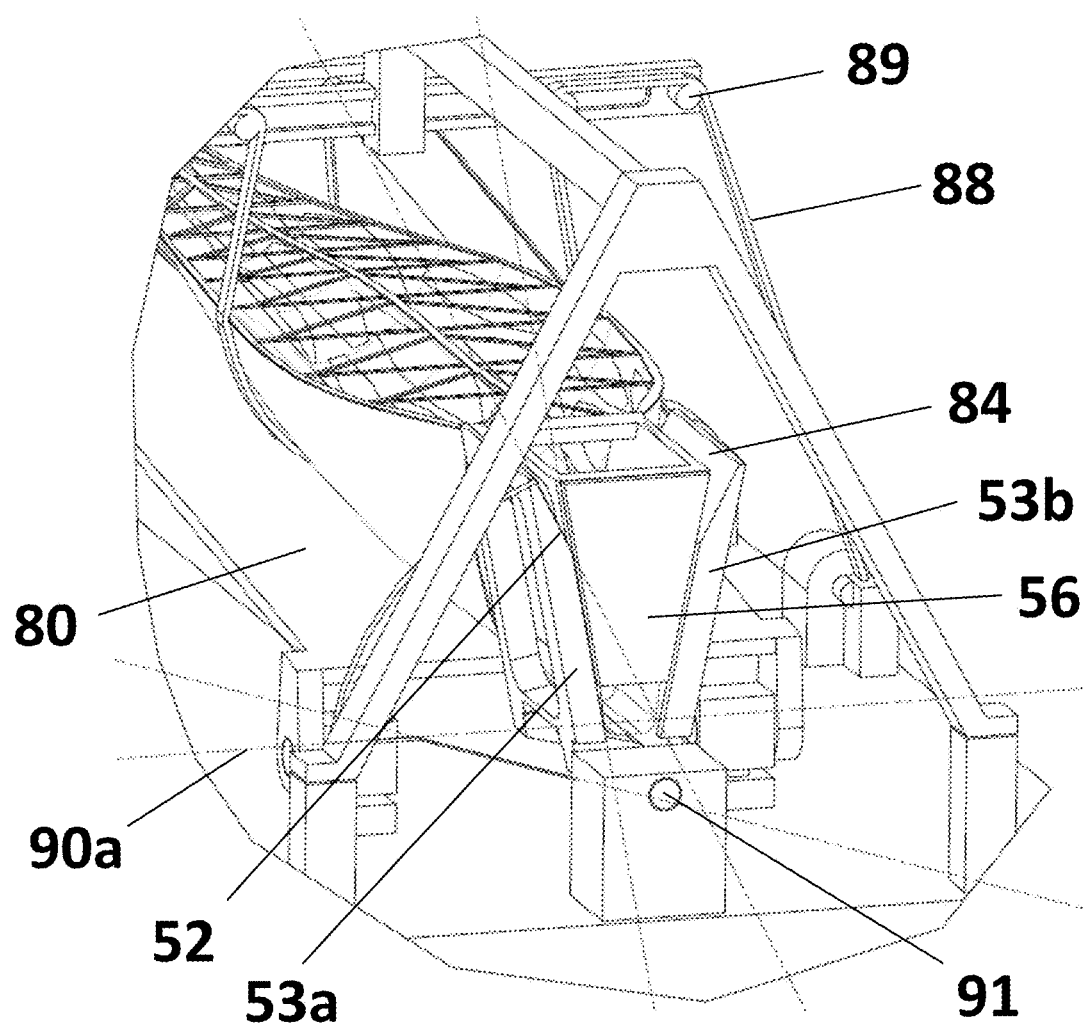
FIG. 16 demonstrates a general view of the machinery from the side of the mechanism for shaping the fixation end. The main features of the mechanism are shown. There can be different variations of the bending technology including robots, prepared shaped mould for shaping by a press/squeezer, but here a simple sufficient arrangement of instruments/devices are revealed.

FIG. 16 shows a general view of the machinery shown in FIG. 15.

Figure 17:
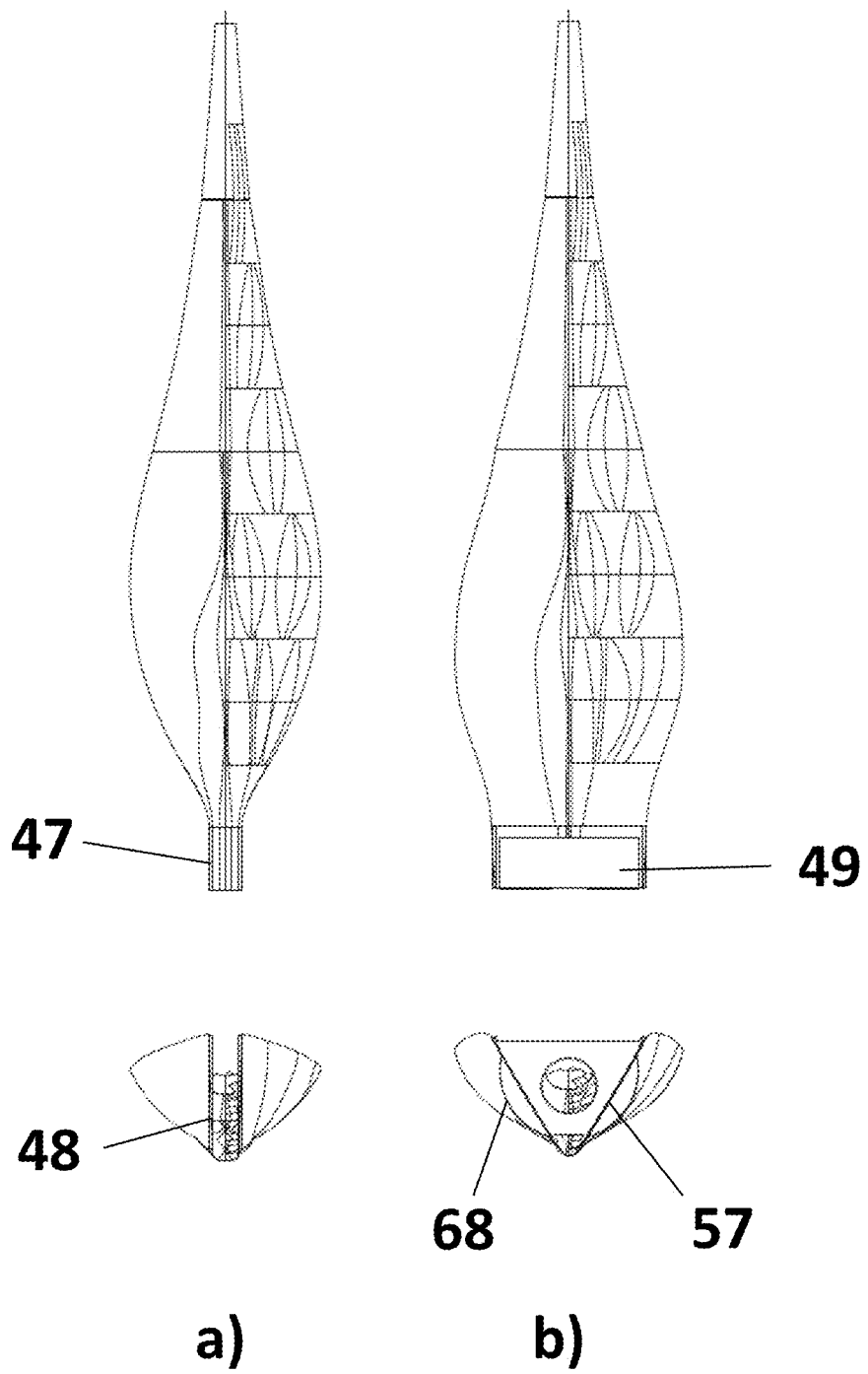
FIG. 17 a), b) shows two carrying bodies that have similar main shapes but different fixation profiles. 17a) shows a rectangular-like fixation profile and 17b) shows a triangular-like profile and a circular one. These profiles are obtained in the same bending process. Variety of the fixation profiles allows us to apply different designs for mounting the wings on the rotation rod. The rectangular and the triangle-like profiles of FIG. 17 a), b) are made by flat pressing parts shown in FIG. 15. The pressing parts can have semi-oval, semi-circle profiles or other shape too so the fixation edge profile can be a circular, elliptical or other the shape. These shapes allow a variety of connection options.

FIG. 17 shows possible fixation profiles of the carrying body. FIG. 17A represents the rectangular-like shape 48 of the fixation end 47 and FIG. 17B shows a triangular-like shape 57 of the fixation end 49. The profiles can have different shapes too, for example, a circle-like shape 68.

Figure 18:
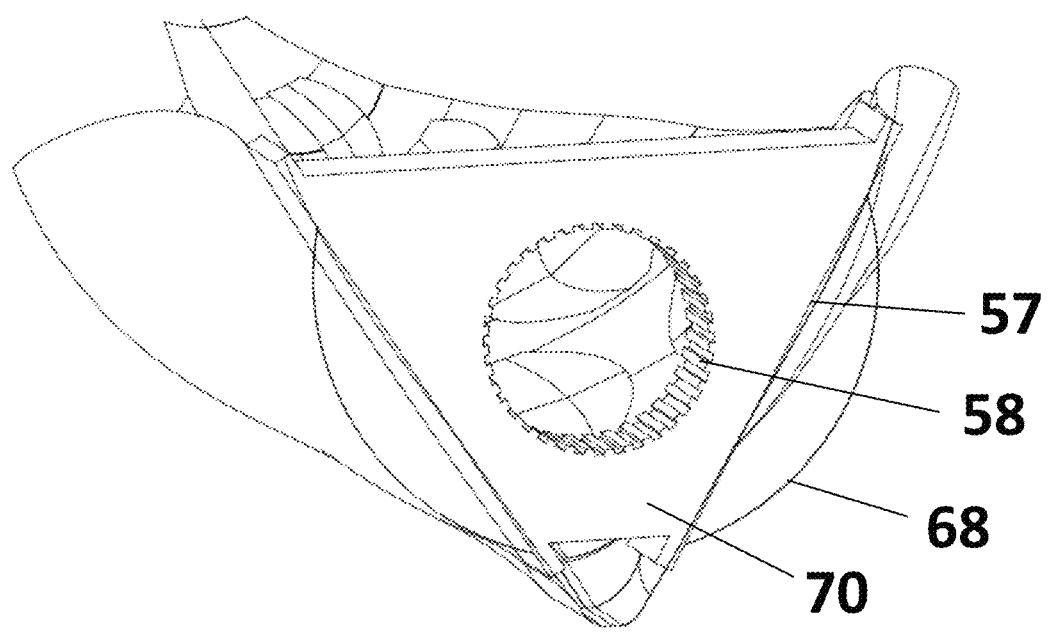
FIG. 18 shows a carrying body with triangle-like fixation shape and a circular shape. The triangle shape allows mounting of the IBWT on the shaft, for example, through a hole made in the triangle fixation plate. This allows rotation of the IBWT around axis of the hole perpendicular to the shaft. The hole is provided with teeth/notches/prongs for gear connection to the shaft. The circular shape allows one to use circular connection parts.

FIG. 18 shows the carrying body with triangular-like fixation plate 70. The fixation plate has a hole 58 with teeth for connection of the carrying body on the rotation shaft of, for example, a wind turbine with possibility to change the angular position of the carrying body on the shaft.

There is a possibility to use other machinery and robots as well, but here we focus on simple and sufficient solution allowing manufacturing the integrated blades of different geometries and shapes. It is understood that the shape of the carrying body can be non-symmetrical and the same fabrication method can be applied.

The invention described here is characterized by the following clauses:

1. An integrated blade with coupled blades for wind turbine comprising a thin curved carrying body, two or more blades mounted in the said carrying body, and supporting/fixation parts. The carrying body has a symmetrical shape against a plane of symmetry, has a prolonged profile narrowing towards one end with gradual decrease of the cross section. The first blade is a curved thin structure, the first edge of which is fixed on the edge of the carrying body on the left/one side from the plane of symmetry, the second edge of the first blade is fixed at the bottom of the carrying body. The second blade is a curved thin structure, the first edge of which is fixed on the plane of symmetry in the points where the cross lines connecting the symmetrical points of the opposite edges of the carrying body intersect with the plane of symmetry, the second edge of the second blade is fixed on the lower part of the carrying body on the right/opposite side from the plane of symmetry. The carrying body has a dense surface on the left-hand part and transparent for air particles on the right-hand part.

2. An integrated blade with coupled blades of wind turbine of clause 1, wherein the blades are oriented parallel to each other.

3. An integrated blade with coupled blades of wind turbine of clause 1, wherein the carrying body has several openings in its structure on the right side from the plane of symmetry.

4. A IBWT of clause 1 or 3, wherein one of the fixation parts is a frame connecting the two opposite edges of the carrying body.

5. A IBWT of any of the above clauses, wherein the first edge of the first blade and the first edge of the second blade are fixed in the fixation frame.

6 A IBWT of any of the above clauses, wherein the surface of the carrying body is covered with a thin cover layer.

7 A IBWT of any of the above clauses, wherein one end of the carrying body is fixed to a solid connection part which is fixed/mounted on the rotation shaft of the turbine.

8 A IBWT of any of the above clauses, wherein one or more blades have high transparency to air particles, said soft type, and other blades have low transparency to air particles, said solid type. The soft type blades are situated above the solid type blades.

9 A IBWT of any of the above clauses, wherein the soft type blades are made of material with variable density.

10 A IBWT of any of the above clauses, wherein the soft type blades are made of thin sheet metal patterned with small holes having diameters ranging from 0.01 mm to 3 mm.

11 A IBWT of any of the above clauses, wherein the soft type blades are made of fibers of polymers.

12 A IBWT of any of clauses 1-7, wherein the soft type blades are made of solid porous material.

13 A IBWT of any of the above clauses, wherein the upper edge of the first soft type blade and the upper edge of the first solid type blade are connected to the left-side edge of the carrying body. The blades are oriented at different angles and their low edges are fixed along different lines on the carrying body, preferably, along the bottom and the left-side of the carrying body.

14 A IBWT of any of the above clauses, wherein the upper edge of the second soft type blade and the upper edge of the second solid type blade are connected along the line on the plane of symmetry above the bottom of the carrying body. The blades are oriented at different angles and their low edges are fixed along different lines on the right side of the carrying body.

15 A IBWT of clause 1, wherein the fixation part is a frame connecting the opposite edges of the carrying body.

16 A IBWR of clause 1, wherein the fixation parts comprise a few bars connecting opposite edges of the carrying body and a belt/rope connecting a number of points on both edges of the carrying body.

17 A method of fabrication of IBWT comprising patterning and shaping/curving of the thin flat carrying body's material, mounting and fixation of two or more thin blades inside the carrying body, mounting of fixation parts on/to the fixation body.

18 A method of fabrication of IBWT of clause 17, wherein fabrication of the carrying body consists of two steps. First step, shaping a flat planar layer of the carrying body's material, (preferably, a thin sheet metal). Geometry of the flat layer is a symmetrical figure against the axis of symmetry, for clarity having similar left-hand side and the right-hand side, the profile of the layer gradually decreases from one end to another end. The wider end is used for fixation of the IBWT to rotation rod of the turbine. Another narrow end is the far most point of the IBWT from the rod. There are several holes/openings made in the layer. The holes/openings cover most of the layer except the fixation part. Second step, the layer of the carrying body is bent symmetrically relative/against the plane of symmetry, where the axis of symmetry coincides with the bottom of the fixation part whereas the bottom line of the main carrying body is tilt against the axis of symmetry during bending process.

19 A method of fabrication of IBWT of clause 17 or 18, wherein the first fixation end of the carrying body obtains shape correlated with shape of the pressing parts and the bending angle. The reminder of the carrying body obtains its gradual U-like shape by squeezing/compressing of the flat base material. Transformation of the shape of the carrying body is defined by intrinsic mechanical spring/stress forces of the material.

20 A method of fabrication of IBWT of any of clauses 17-19, wherein 3D shaping of the carrying body is made gradually by simultaneous forming of the fixation end and the main geometrical shape/geometry of the carrying body. During the shaping, the bottom line is tilting relative to the initial axis of symmetry, so the axis of symmetry of the main shape of the carrying body is changing during the deformation of the shape. Formation of the fixation end of the carrying body is made by two pressing parts, for example, by rotating them around initial axis of symmetry. Deformation of the rest of the carrying body is made, for example, by tightening strips around the carrying body at different locations along the bottom line.

21 A method of fabrication of IBWT of any of clauses 17-19, wherein shaping of the carrying body is made in the mould having a cavity having the final shape and a pressing part that has slightly smaller similar shape. The initial flat template of the carrying body is placed in between the mould and the press, and then the pressing part goes inside the cavity of the mould deforming the carrying body to the required shape.

22 A method of fabrication of IBWT of any of clauses 17-18, wherein the shapes of the blades are defined by geometry of the carrying body. The surface of the first blade is made by connection and/or stretching of the thin material between the first edge of the formed carrying body at one (left-hand) side from the plane of symmetry to the bottom of the carrying body. The surface of the second blade is made by connection and/or stretching of the thin material between the line obtained by intersection of the plane of symmetry and the (virtual) surface obtained by connection of the two symmetrical opposite edges of the carrying body with the line on the other (right-hand) side of the carrying body.

23 A method of fabrication of IBWT of any of clauses 17 to 19, wherein the surfaces of the blades are oriented near-parallel to each other (when the intersection lines obtained by virtual intersection of the blades with the cross-section plane of the carrying body, the plane being perpendicular to the bottom line, at different points along the bottom line).

24 A method of fabrication of IBWT of any of clauses 17 to 19, wherein the surfaces of the blades are oriented at slightly different angles aiming to catch air flows/winds from slightly different directions, preferably differing between 0 and 30 degrees.

25 A method of fabrication of IBWT of any of clauses 17 to 22, wherein the opposite edges of the carrying body are interconnected by fixation parts.

26 A method of fabrication of IBWT of any of clauses 17 to 22, wherein the fixation parts are solid straight bars.

27 A method of fabrication of IBWT of any of clauses 17 to 22, wherein the fixation parts include a rope/strip which is tightened between different points of the edges.

28 A method of fabrication of IBWT of any of clauses 17 to 22, wherein the fixation part is a single part connected the edges of the carrying body, the fixation part has openings to allow incident air flow to go through it to interact with the blades.

29 A method of fabrication of IBWT of any of clauses 17 to 28, wherein The upper edges of the blades are fixed to the fixation parts.

30 A method of fabrication of IBWT of any of clauses 17 to 22, wherein the openings of the carrying body beneath the first blade, about one half of the carrying body, are closed by a thin material covering the carrying body surface beneath the first blade.

31 A method of fabrication of IBWT of any of clauses 8 to 10, wherein the carrying body is made of sheet metal made of aluminum, still, titanium, allows.

32 A method of fabrication of IBWT of any of clauses 17 to 19, wherein the carrying body is made of plastic, polymer, mixture of plastic with metals, carbon.

33 A method of fabrication of IBWT of any of clauses 17 to 19, wherein the openings in the carrying body are made by a laser beam.

34 A method of fabrication of IBWT of any of clauses 17 to 19, wherein the openings in the carrying body are made by a mechanical press or drilling.

35 A method of fabrication of IBWT of any of clauses 17 to 19, wherein the blades are made of thin metal sheet or textile or rubber or plastic or metallized textile or mixture of these materials.

36 A method of fabrication of IBWT of any of clauses 25 to 29, wherein the fixation parts are made of metal, or plastic, or polymer, or fiber, or textile or wood or mixture of these.

LIST OF ELEMENTS 1 flat template/template
2 (rotation) shaft
3 fixation part
4 opening
5 Integrated blade
6 Integrated blade
7 main bottom line (bottom of the carrying body)
8 opening
9 opening
9a opening
9b opening
10 (thin) curved carrying body
10R edge of the carrying body
10L edge of the carrying body
10S fraction/section of the carrying body
11 fixation end of the carrying body
12 opening
12a opening
12b opening
14 opening
15 cross bar
16 cross bar
17 fixation frame
18 belt/strip/rope
19 cross bar
20 Integrated blade
21 (thin curved) (first) blade
21H top edge of the first blade
21L lower edge of the first blade
22 (thin curved) (second) blade
22H top edge of the second blade
22 L lower edge of the second blade
23 thin curved blade
25 incoming air flow
26 reflected air flow
27 penetrated air flow
28 reflected air flow
29 incoming air flow
30 reflected air flow
31 penetrated air flow
32 reflected air flow
33 fixation frame
34 cover film/layer
35 cylinders/tubes/hooks
36 fixation frame
37 intermediate fraction/section of the carrying body
38 bar
39 cover film/layer
40 connection part
41 blade
42 blade
43 blade
44 blade
45 curved section line of the carrying body
46 curved section line of the carrying body
47 fixation end
48 rectangular like shape
49 fixation end
50 fixation points at carrying body
51,52 facets of pressing part 53a
53 pressing part
53a pressing part
53b pressing part
55 fixation part
56 fixation plate
57 triangular-like shape
58 hole of the fixation part
60 base
61 vertical frame
62 vertical frame
63 horizontal bar
64, 65 T-shaped structures
66,67 cross bars of T-shaped structures
68 circle like shape
70 triangular like fixation plate
71 rolling device
72 rolling device
73 rotation mechanism
74 lifting mechanism
75 blade
75L lower edge of blade 75
76 blade/sub-layer
76L lower edge of the blade 76
77 blade
78 blade/sub-layer
80 platform
81 fixation line
82 fixation line
83,84 facets of pressing part 53b
87, 88 belts
89 rollers
90 shaft
90a axis of shaft 90
91 shaft
92 first fraction bottom line
93 intermediate fraction bottom line
95 line
96 line
99 intersection line
100 axis of symmetry of the flat template

101, 102 incoming air flow
103, 104 reflected air flow
F1, F2 mechanical pushing forces
P plane of symmetry
VL1 vertical line
VL2 vertical line

The invention claimed is:

1. An integrated blade with coupled blades for a wind turbine (IBWT) comprising:
   a thin curved carrying body (10);
   at least a first (21) and a second (22) blade mounted in said carrying body, and supporting/fixation parts (33,70), wherein
   the carrying body has a symmetrical shape against a plane of symmetry (P), a first (10L) and a second edges (10R), and a narrowing prolonged profile where narrowing preferably starts from a widest part of the carrying body and continues towards one end of the carrying body with gradual decrease of a cross section;
   the first blade being a curved thin structure having a top edge of the first blade (21H) and a lower edge lower edge of the first blade (21L),
   the top edge of the first blade being fixed on the first edge of the thin curved carrying body on one side from the plane of symmetry,
   the lower edge being fixed at a bottom (7) of the carrying body;
   the second blade (22) being a curved thin structure having a top edge of the second blade (22H) and a lower edge of the second blade (22L),
   the top edge of the second blade being fixed on the plane of symmetry in points where cross lines connecting symmetrical points of the first and the second edges of the carrying body intersect with the plane of symmetry,
   the lower edge of the second blade is fixed on fixation points (50) in a lower part of the carrying body on an opposite side from the plane of symmetry; and
   the carrying body has a dense surface on one side from the plane of symmetry and transparent structure for air particles on another side from the plane of symmetry.

2. The IBWT of claim 1, wherein the at least first and second blades are oriented near parallel to each other.

3. The IBWT of claim 1, wherein the carrying body has several openings on one side from the plane of symmetry.

4. The IBWT of claim 1, wherein one of the fixation parts is a fixation frame connecting the the first and second edges of the carrying body.

5. The IBWT of claim 4, wherein the top edge of the first blade and the top edge of the second blade are fixed in the fixation frame.

6. The IBWT of claim 1, wherein one end of the carrying body is fixed to a solid connection part which is fixed/mounted on a rotation shaft of the wind turbine.

7. The IBWT of claim 1, wherein one or more blades of the at least first and second blades are soft type blades having high transparency to air particles, and other blades of the at least first and second blades are solid type blades having low transparency to air particles, the soft type blades are situated above the solid type blades, and the soft type blades are preferably made of material with variable density.

8. The IBWT of claim 7, wherein the soft type blades are made of material selected from a group consisting of thin sheet metal patterned with small holes having diameters ranging from 0.01 mm to 3 mm multiplied by number of meters of the length of the blade, fibers of polymers, and solid porous material.

9. The IBWT of claim 7, wherein a top edge of a first soft type blade and a top edge of a first solid type blade are connected to the first edge of the carrying body, the first soft type blade and the first solid type blade are oriented at different angles and the lower edges of the first soft type blade and the first solid type blade are fixed along different lines on the carrying body, preferably, along the bottom and first edge side of the carrying body.

10. The IBWT of claim 7, wherein the upper edge of the second soft type blade and a top edge of a second solid type blade are connected along a line on the plane of symmetry above the bottom of the carrying body, the second soft type blade and the second solid type blade are oriented at different angles and the lower edges of the second soft type blade and the second solid type blade are fixed along different lines on a second side of the carrying body.

11. The IBWT of claim 1, wherein the fixation part is a frame connecting the first and second edges of the carrying body or the fixation parts comprise at least one bar connecting the first and second edges of the carrying body and a belt/rope connecting a number of points on the first and second edges of the carrying body.

* * * * *